US011546559B2

(12) United States Patent
Suzuki et al.

(10) Patent No.: US 11,546,559 B2
(45) Date of Patent: Jan. 3, 2023

(54) INFORMATION PROCESSING DEVICE AND METHOD FOR CONTROLLING IMAGE DATA THEREOF

(71) Applicant: Maxell, Ltd., Kyoto (JP)

(72) Inventors: Motoyuki Suzuki, Yamazaki (JP); Yasunobu Hashimoto, Oyamazaki (JP); Kazuhiko Yoshizawa, Oyamazaki (JP); Hiroshi Shimizu, Oyamazaki (JP); Shigetaka Kimura, Tokyo (JP); Shinji Shibuya, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/738,023

(22) Filed: Jan. 9, 2020

(65) Prior Publication Data

US 2020/0145622 A1 May 7, 2020

Related U.S. Application Data

(63) Continuation of application No. 15/775,406, filed as application No. PCT/JP2016/083752 on Nov. 15, 2016, now Pat. No. 10,582,165.

(30) Foreign Application Priority Data

Nov. 18, 2015 (JP) .................. 2015-225337

(51) Int. Cl.
*H04N 9/80* (2006.01)
*H04N 7/18* (2006.01)
(Continued)

(52) U.S. Cl.
CPC ............. *H04N 7/185* (2013.01); *G01S 19/48* (2013.01); *G08B 13/19669* (2013.01);
(Continued)

(58) Field of Classification Search
USPC .......................... 386/248, 278; 348/143, 158
See application file for complete search history.

(56) References Cited

U.S. PATENT DOCUMENTS 6,232,917 B1 * 5/2001 Baumer ................. G01C 21/26
701/414
7,801,542 B1 * 9/2010 Stewart ................. G06Q 50/01
455/518
(Continued)

FOREIGN PATENT DOCUMENTS

JP 2002-051118 A 2/2002
JP 2003-198918 A 7/2003
(Continued)

OTHER PUBLICATIONS

International Search Report of PCT/JP2016/083752 dated Feb. 7, 2017.

*Primary Examiner* — Nigar Chowdhury
(74) *Attorney, Agent, or Firm* — Mattingly & Malur, PC

(57) ABSTRACT

The purpose of the present invention is to provide an information processing device that realizes more suitable ease of use. To accomplish the purpose, there is provided an information processing device provided with a video input unit for acquiring image data from an optical image, a signal receiver unit for acquiring a position computation signal, a communication unit for transmitting the image data, a first memory unit for storing position information pertaining to a place to which the image data is not transmitted, and a control unit for controlling the execution of image data transmission on the basis of the position information acquired from the position calculation signal and the position information stored in the first storage unit.

14 Claims, 22 Drawing Sheets

(51) Int. Cl.

| | | |
|---|---|---|
| G01S 19/48 | (2010.01) | |
| G08B 13/196 | (2006.01) | |
| H04N 5/232 | (2006.01) | |
| H04N 5/77 | (2006.01) | |
| H04N 5/765 | (2006.01) | |
| H04N 7/04 | (2006.01) | |
| H04N 5/93 | (2006.01) | |
| G11B 27/00 | (2006.01) | |
| G01S 19/13 | (2010.01) | |

(52) U.S. Cl.
CPC ......... *H04N 5/23293* (2013.01); *H04N 5/765* (2013.01); *H04N 5/77* (2013.01); *H04N 7/04* (2013.01); *H04N 7/188* (2013.01); *G01S 19/13* (2013.01); *G08B 13/19684* (2013.01); *G08B 13/19689* (2013.01); *H04N 5/23216* (2013.01)

(56) References Cited

U.S. PATENT DOCUMENTS

| | | | |
|---|---|---|---|
| 8,717,411 B2 | 5/2014 | Hanai | |
| 8,761,794 B2* | 6/2014 | Rekimoto | H04W 4/029 455/456.1 |
| 9,009,847 B2* | 4/2015 | Nakamura | G06F 21/629 726/28 |
| 9,191,490 B2* | 11/2015 | Taylor | H04M 1/72463 |
| 9,552,844 B2* | 1/2017 | Fujimoto | G11B 27/3027 |
| 9,871,999 B2* | 1/2018 | Kardashov | G08B 19/00 |
| 10,024,978 B2 | 7/2018 | Ben-Akiva | |
| 2004/0174264 A1* | 9/2004 | Reisman | G08B 21/0202 340/573.4 |
| 2005/0251330 A1* | 11/2005 | Waterhouse | G08G 1/202 701/465 |
| 2008/0033639 A1* | 2/2008 | Nakamura | G01C 21/32 701/532 |
| 2009/0005959 A1* | 1/2009 | Bargman | G06V 20/10 701/117 |
| 2009/0292458 A1* | 11/2009 | Nakamura | G08G 1/096827 701/532 |
| 2009/0322890 A1* | 12/2009 | Booking | H04N 5/23206 348/211.2 |
| 2011/0018998 A1 | 1/2011 | Guzik | |
| 2011/0077855 A1 | 3/2011 | Sumizawa | |
| 2011/0175931 A1* | 7/2011 | Ikeuchi | G09B 29/106 345/637 |
| 2011/0238287 A1* | 9/2011 | Hayashi | G01C 21/3682 701/532 |
| 2011/0246056 A1 | 10/2011 | de Silva | |
| 2012/0191339 A1* | 7/2012 | Lee | G01C 21/3647 701/410 |
| 2012/0253488 A1* | 10/2012 | Shaw | G06Q 10/06 700/91 |
| 2013/0157698 A1 | 6/2013 | Kaido | |
| 2013/0303187 A1 | 11/2013 | Nishina | |
| 2013/0304349 A1 | 11/2013 | Davidson | |
| 2015/0248795 A1 | 9/2015 | Davidson | |
| 2015/0338116 A1* | 11/2015 | Furuta | F24F 11/30 700/276 |

FOREIGN PATENT DOCUMENTS

| | | |
|---|---|---|
| JP | 2005-229345 A | 8/2005 |
| JP | 2006-086582 A | 3/2006 |
| JP | 2009-224899 A | 10/2009 |

\* cited by examiner

F I G. 2
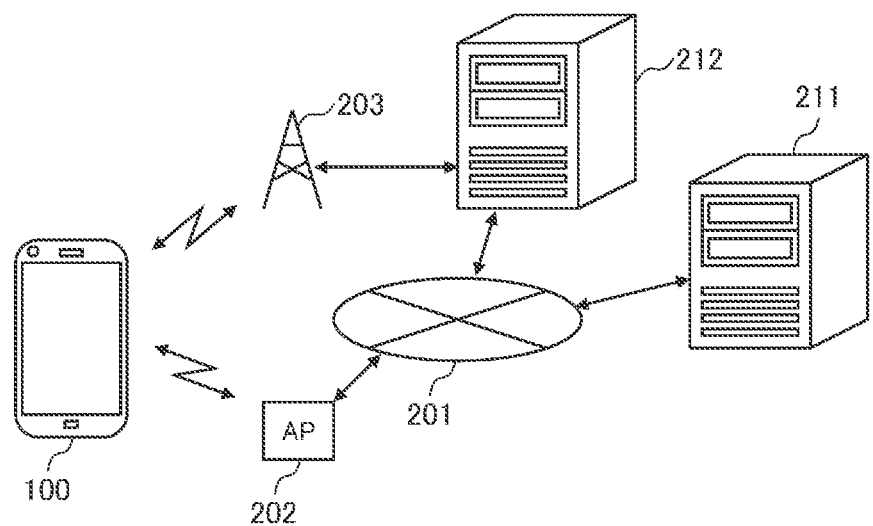

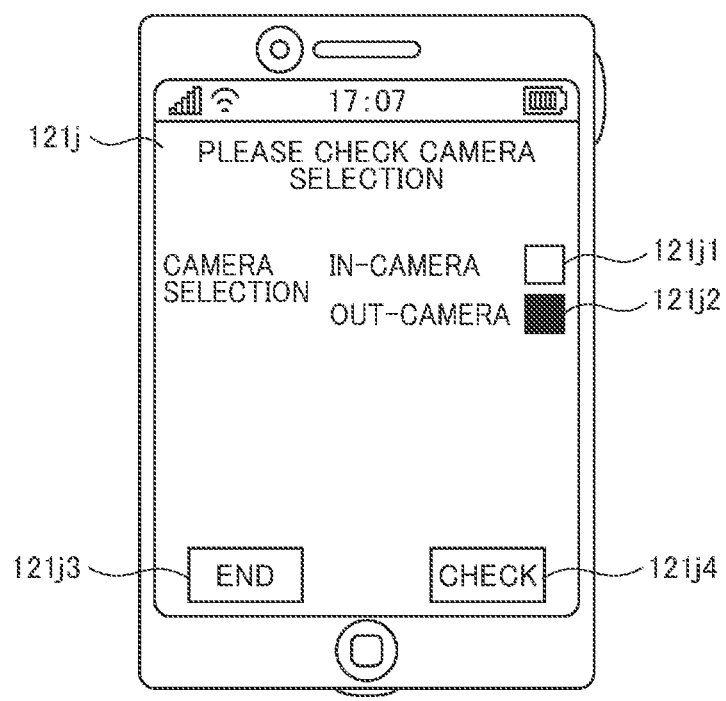
F I G. 1 5

F I G. 2 0
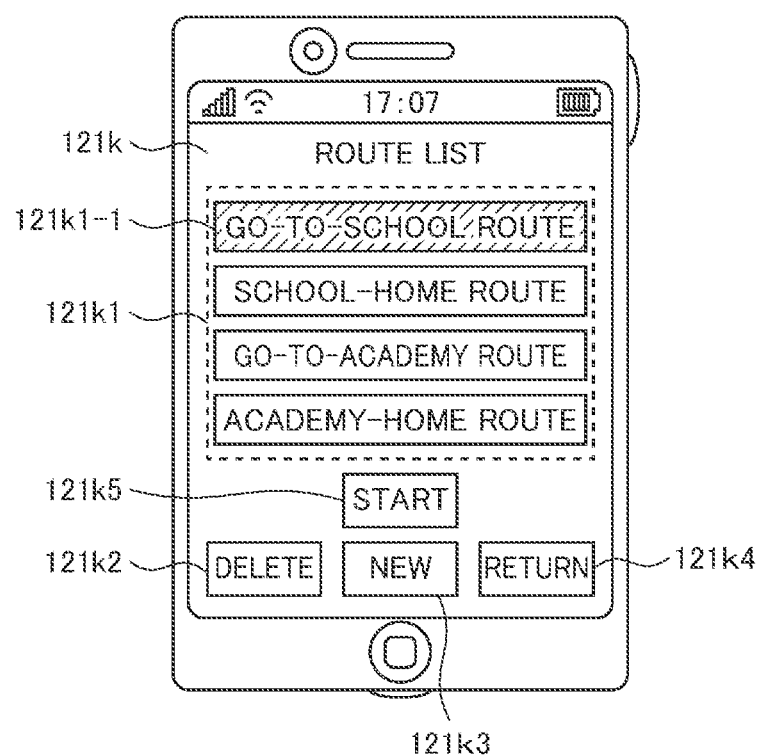

INFORMATION PROCESSING DEVICE AND METHOD FOR CONTROLLING IMAGE DATA THEREOF

TECHNICAL FIELD

The present invention relates to an information processing device and a method for controlling image data thereof.

BACKGROUND ART

A monitoring camera of the related art is installed fixedly in a shop or the like to store captured videos or still images in order to prevent and solve a crime. When a crime occurs, information for specifying a criminal can be obtained from the stored image. However, it is difficult to cope with a case where an individual is attacked by a burglar or the like in a place where no security camera is installed during commutation or going to school. In this regard, a portable security camera installed in a body of an individual to monitor the surroundings of the body at all times has been proposed.

As a background art of this technical field, JP 2006-86582 A (Patent Document 1) has been proposed. The apparatus of Patent Document 1 has a signal input unit that receives an image signal, a signal temporary storage that temporarily stores the received image signal, an emergency detection means that detects occurrence of an abnormality in or around a human body, and a signal accumulator that receives and stores the image signal from the signal temporary storage on the basis of the abnormality signal detected by the emergency detection means. In the technique of Patent Document 1, the image signal can be stored in the signal temporary storage or the signal accumulator by the abnormality signal such as a huge vibration detected by the emergency detection means without being removed. In addition, information is transmitted to a fixed station such as a security office and is provided for monitoring or storing purposes.

CITATION LIST

Patent Document

Patent Document 1: JP 2006-86582 A

SUMMARY OF THE INVENTION

Problems to be Solved by the Invention

In the technique of Patent Document 1, even when a criminal takes away or completely destroys the portable security camera, the image signal can be stored in the fixed station, so that it is possible to prevent evidence photographs from being removed. For example, assuming that images are stored in an image data server via a network, if a user starts a camera photographing operation when going out from home, and forgets stopping the shooting when returning home, the images are stored in the home and are also transmitted to the image data server. This makes the image data unnecessarily transmitted and stored and disadvantageously increases data communication traffics or a storage capacity of the memory area of the image server. In addition, if a user forgets to start the camera photographing operation when going out, no image is stored in the image data server. That is, when a user forgets to start or terminate the photographing operation, image data are not stored, or unnecessary image data are stored disadvantageously.

An object of the invention is to provide an information processing device capable of realizing more suitable usability.

Solutions to Problems

According to an aspect of the invention, there is provided an information processing device including: an image input unit that acquires image data from an optical image; a signal receiver unit that acquires a position computation signal; a communication unit that transmits the image data; a first memory unit that stores position information on a place from which no image data is transmitted; and a control unit that controls execution of transmission of the image data on the basis of position information acquired from the position computation signal and the position information stored in the first memory unit.

Effects of the Invention

According to the invention, it is possible to provide an information processing device capable of realizing more suitable usability.

BRIEF DESCRIPTION OF THE DRAWINGS

FIG. 2 is a diagram illustrating an exemplary configuration of a communication system including the image recording device according to the first embodiment.

FIG. 15 is a diagram illustrating a display example of a display screen of a warning screen of FIG. 12.

FIG. 20 is a diagram illustrating a display example of a display screen of a route list.

MODE FOR CARRYING OUT THE INVENTION

Embodiments of the invention will now be described with reference to the accompanying drawings.

First Embodiment

Figure 1A:
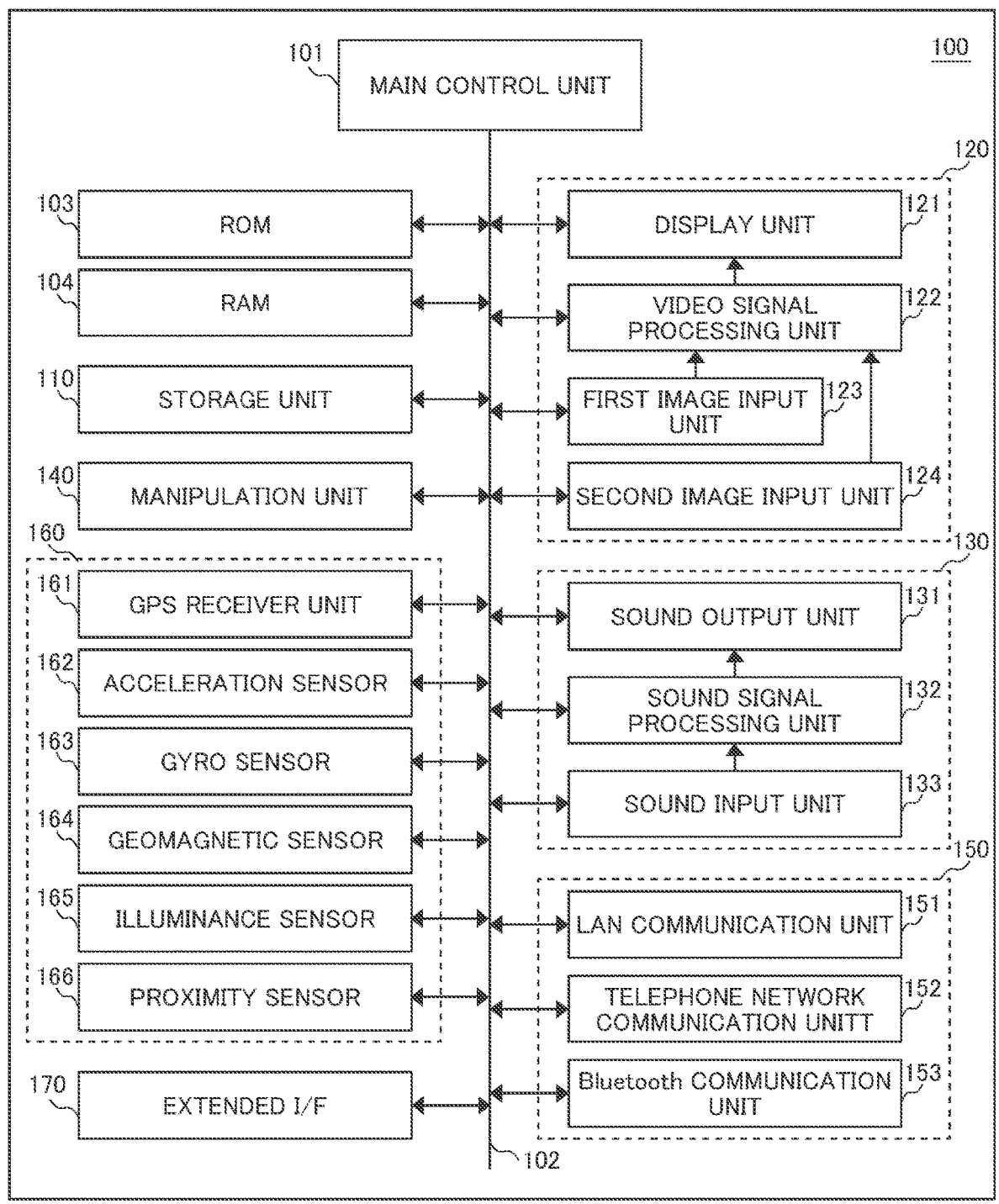
FIG. 1A is a block diagram illustrating an exemplary configuration of an image recording device according to a first embodiment.

FIG. 1A is a block diagram illustrating an exemplary configuration of an image recording device as an information processing device according to this embodiment. In FIG. 1A, the image recording device 100 has a main control unit 101, a system bus 102, a read-only memory (ROM) 103, a random access memory (RAM) 104, a storage unit 110, an image processing unit 120, a sound processing unit 130, a manipulation unit 140, a communication processing unit 150, a sensor unit 160, and an expanded interface unit 170.

Figure 1B:
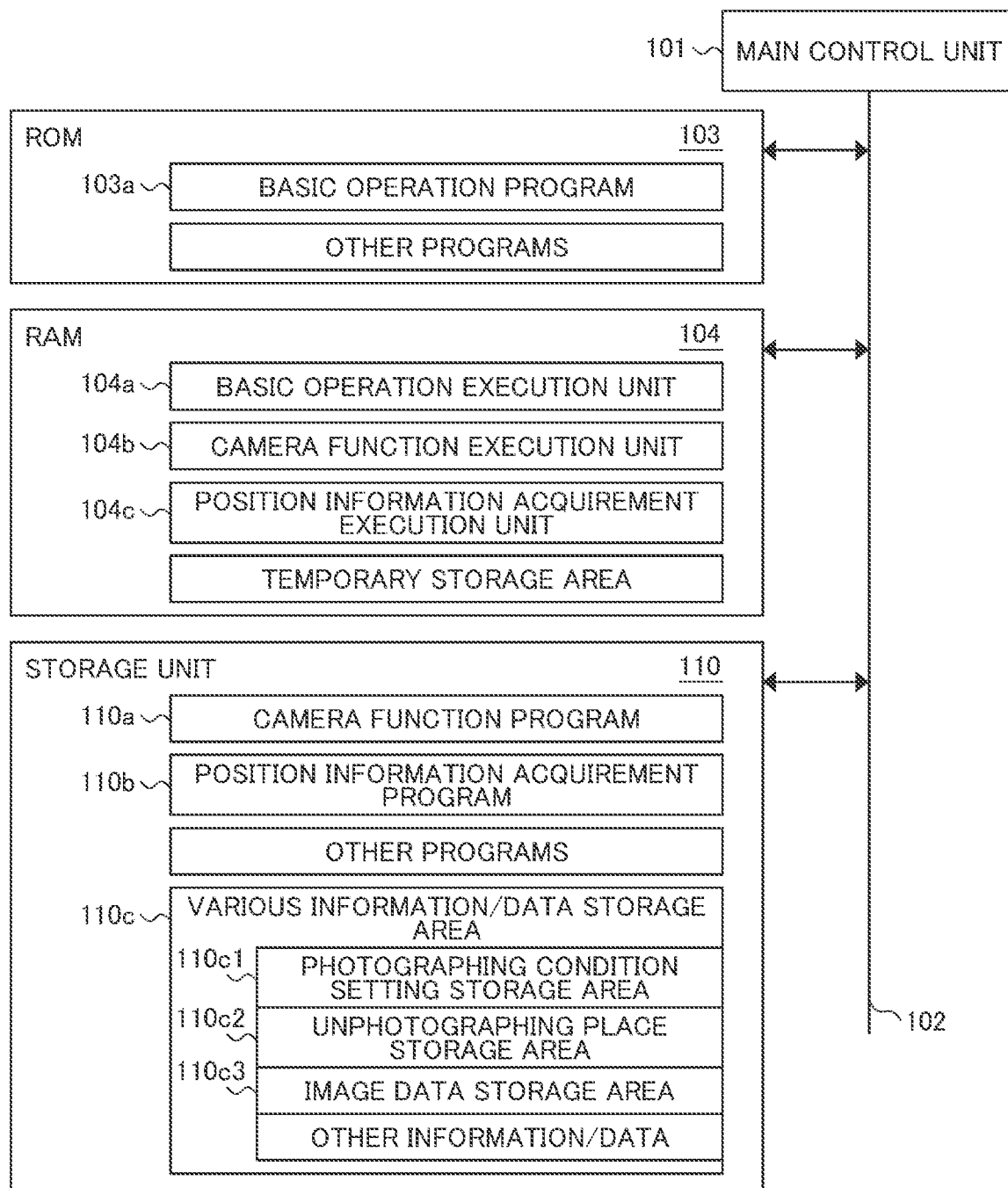
FIG. 1B is a diagram illustrating an exemplary software configuration of the image recording device according to the first embodiment.

FIG. 1B is a diagram illustrating an exemplary software configuration of the image recording device 100 according to this embodiment and illustrates software configurations of the ROM 103, the RAM 104, and the storage unit 110. Details will be described below.

FIG. 2 is a diagram illustrating an exemplary configuration of a communication system including an image recording device 100 according to this embodiment. In FIG. 2, the communication system includes an image recording device 100, a wide-area public network 201 such as the Internet, a radio communication access point 202 of the wide-area public network, a base station 203 of a mobile telephone communication network, an image data server 211, and a mobile telephone communication server 212. The image recording device 100 may be a mobile phone or smart phone provided with a camera function, a digital camera, or the like. Alternatively, the image recording device 100 may include an image-recordable video camera, a portable game machine, a portable digital device, or the like.

In FIG. 1A, the main control unit 101 is a microprocessor unit that controls the image recording device 100 as a whole on the basis of a predetermined program. The system bus 102 is a data communication path for transmitting and receiving data between the main control unit 101 and each part of the image recording device 100.

The ROM 103 is a memory that stores a basic operation program such as an operating system, or other application programs. The ROM 103 includes, for example, an electrically erasable programmable ROM (EEPROM), or a rewritable ROM such as a flash ROM. A new version or a function expansion of the basic operation program or other application programs becomes available by updating the program stored in the ROM 103.

The RAM 104 serves as a work area for executing the basic operation program or other application programs. Specifically, for example, the basic operation program 103a stored in the ROM 103 is deployed in the RAM 104, and the main control unit 101 executes the deployed basic operation program, so that a basic operation execution unit 104a is implemented. In the following description, for simplicity purposes, it is assumed that a process of performing control of each part using the main control unit 101 by deploying and executing the basic operation program 103a stored in the ROM 103 on the RAM 104 is performed as the basic operation execution unit 104a performs control of each part. Note that this similarly applies to other application programs.

The ROM 103 and the RAM 104 may be integrated with the main control unit 101. Alternatively, instead of the independent structure of FIG. 1A, a part of the storage area of the storage unit 110 may also be used as the ROM 103. In addition, it is assumed that the RAM 104 has a temporary storage area that temporarily stores data as necessary when various application programs are executed.

The storage unit 110 stores setting values of each operation of the image recording device 100, information on users of the image recording device 100, and the like. In addition, the storage unit 110 may store still image data or video data photographed by the image recording device 100.

A part of the area of the storage unit 110 may be partly or entirely substituted with the functions of the ROM 103. In addition, the storage unit 110 is necessary to hold the stored information even when power is not supplied to the image recording device 100. Therefore, for example, a flash ROM, a solid state drive (SSD), a hard disc drive (HDD) or the like are employed.

The image processing unit 120 has a display unit 121, a video signal processing unit 122, a first image input unit 123, and a second image input unit 124. For example, the display unit 121 is a display device such as a liquid crystal display panel and provides video data processed by the video signal processing unit 122 to a user of the image recording device 100. The video signal processing unit 122 has a video RAM (not shown), and the display unit 121 is driven on the basis of the video data input to the video RAM. In addition, it is assumed that the video signal processing unit 122 performs format conversion, a superimposing process for a menu or other signals such as an on-screen display (OSD) signal, and the like as necessary. The first and second image input units 123 and 124 are camera units that convert an optical signal input from a lens to an electrical signal using an electronic device such as a charge-coupled device (CCD) or a complementary metal oxide semiconductor (CMOS) sensor to receive video data for a surrounding or an object. Note that, since the data acquired from the camera unit are videos or still images, they will be referred to as "image data" including video data.

The sound processing unit 130 has a sound output unit 131, a sound signal processing unit 132, and a sound input unit 133. The sound output unit 131 is a loudspeaker that provides a sound signal processed by the sound signal processing unit 132 to a user of the image recording device 100. The sound input unit 133 is a microphone to convert sound from a user or the like into sound data and inputs the sound. Note that the sound input unit 133 may be provided separately from the image recording device 100 and may be connected to the image recording device 100 via wired or wireless communication.

The manipulation unit 140 is an instruction input unit used to input a manipulation instruction to the image recording device 100. According to this embodiment, it is assumed that the manipulation unit 140 includes a touch panel 140t arranged overlappingly with the display unit 121 and a manipulation key set 140k in which button switches are arranged side by side. The manipulation unit 140 may also have only one of the touch panel 140t and the manipulation key set 140k.

The communication processing unit 150 includes a local area network (LAN) communication unit 151, a mobile telephone network communication unit 152, and a BlueTooth (registered trademark) communication unit 153. The LAN communication unit 151 is connected to a radio communication access point 202 of the Internet 201 via radio communication to transmit and receive data. The mobile telephone network communication unit 152 performs radio communication with a base station 203 of the mobile telephone communication network to transmit and receive a telephone communication (call) or data. The BlueTooth communication unit 153 performs radio communication with corresponding devices. Each of the LAN communication unit 151, the mobile telephone network communication unit 152, and the BlueTooth communication unit 153 has an encoder, a decoder, an antenna, and the like. In addition, they may also have an infrared communication unit or the like.

The sensor unit 160 is a group of sensors for detecting a state of the image recording device 100. According to this embodiment, the sensor unit 160 has a global positioning system (GPS) receiver unit 161, an acceleration sensor 162, a gyro sensor 163, a geomagnetic sensor 164, an illuminance sensor 165, and a proximity sensor 166. Using this group of sensors, it is possible to detect a position, movement, inclination, direction, and surrounding brightness of the image recording device 100, a proximity situation of a surrounding object, and the like. The sensor unit 160 may additionally have other sensors.

The expanded interface unit 170 is an interface group for expanding the function of the image recording device 100. According to this embodiment, it is assumed that the expanded interface unit 170 has a video/sound interface, a universal serial bus (USB) interface, a memory interface, and the like. The video/sound interface receives a video signal and/or a sound signal from an external video/sound output device and outputs a video signal and/or a sound signal to an external video/sound input device, and the like. The USB interface provides connection of a keyboard or other USB devices. The memory interface provides connection of a memory card or other memory media to transmit or receive data.

In addition, although not shown in the drawings, other configurations such as a digital TV broadcast receiver function, an electronic money settlement function may also be added.

Operations of the image recording device 100 according to this embodiment will now be described. Here, general operations/manipulations of a camera device, such as focusing or exposure, are well known in the art, and they will not be described. Furthermore, it is assumed that, as illustrated in FIG. 1B, operations of the image recording device 100 according to this embodiment are principally controlled by a basic operation execution unit 104a, a camera function execution unit 104b, and a position information acquirement execution unit 104c configured by deploying a basic operation program 103a of the ROM 103, a camera function program 110a stored in the storage unit 110, and a position information acquirement program 110b on the RAM 104 and executing them using the main control unit 101. Alternatively, the image recording device 100 according to this embodiment may further include hardware blocks capable of realizing equivalent operations of the camera function execution unit 104b and position information acquirement execution unit 104c described above with hardware components, so that each of the hardware blocks may control the operations of the image recording device 100 instead of the camera function execution unit 104b and the position information acquirement execution unit 104c.

Figure 3A:
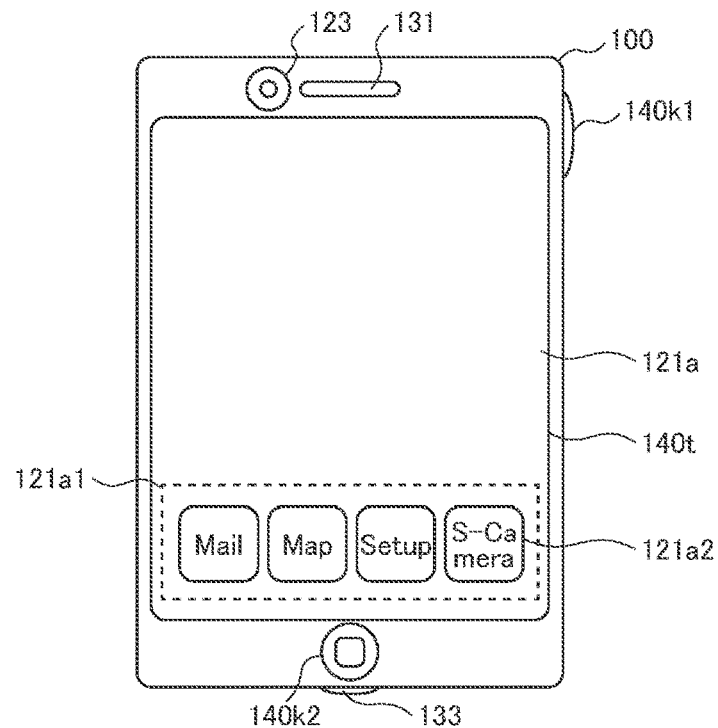
FIGS. 3A and 3B are a diagram illustrating an exemplary exterior of the image recording device according to the first embodiment and a display example of a basic screen.
Figure 3B:
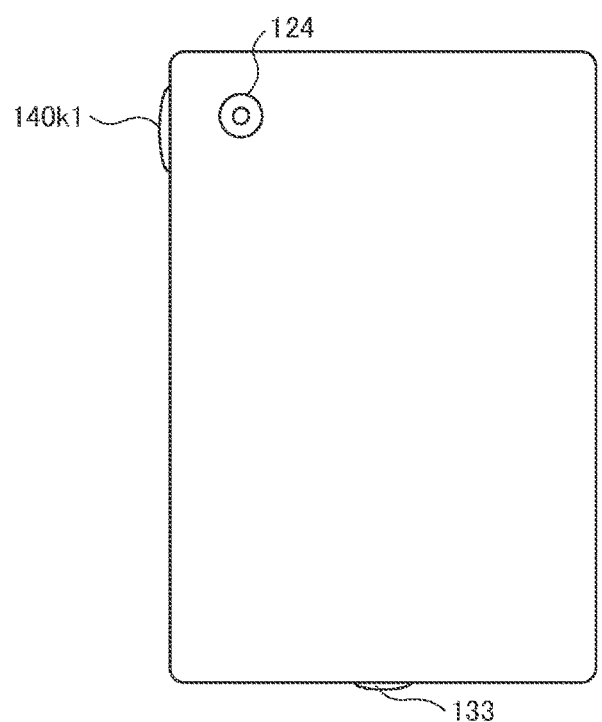

FIGS. 3A and 3B illustrate an exterior example of the image recording device 100 and a display example of the basic screen 121a according to this embodiment. Note that, in FIGS. 3A and 3B, the exterior diagram is created by assuming that the image recording device 100 is an information terminal device such as a smart phone. FIG. 3A is a front view illustrating the image recording device 100, and FIG. 3B is a rear view illustrating the image recording device 100. The left and right side surfaces and top and bottom surfaces are not illustrated. Note that, according to this embodiment, it is assumed that the first image input unit 123 is placed on the same side (front surface) as that of the display unit 121, and the second image input unit 124 is placed on the opposite side (rear surface) of the display unit 121 as illustrated in FIGS. 3A and 3B. In the following description, the first image input unit 123 placed on the same side as that of the display unit 121 may be referred to as "in-camera", and the second image input unit 124 placed on the opposite side to the display unit 121 may be referred to as "out-camera" in some cases. Note that the second image input unit 124 may not be placed on the same surface as that of the display unit 121 or the rear surface. In addition, the second image input unit 124 may be provided separately from the image recording device 100 or may be connected to the image recording device 100 via wired or wireless communication.

In FIG. 3A, the basic screen 121a is displayed on the display unit 121 when the image recording device 100 is powered on by pressing a power key 140k1, or when a home key 140k2 is pressed during execution of any application program. A group of icons 121a1 associated with each application program executable by the image recording device 100 are displayed on the basic screen 121a, so that a predetermined application program associated with the selected icon is executed when any icon is selected.

Note that selection of the icon may be performed by tapping a predetermined region on a touch panel 140t corresponding to a position on the display unit 121 where a desired icon is displayed, or the like. Alternatively, the selection may also be performed by manipulating a manipulation key such as a cross cursor key and a selection key (not shown).

The icon 121a2 displayed on the basic screen 121a is an icon associated with a camera function program 110a characterizing the image recording device 100 according to this embodiment. The camera function execution unit 104b is activated by selecting the icon 121a2 by tapping or the like. Operation examples of the camera function characterizing the image recording device 100 according to this embodiment will now be described with reference to the flowchart of FIG. 4.

Figure 4:
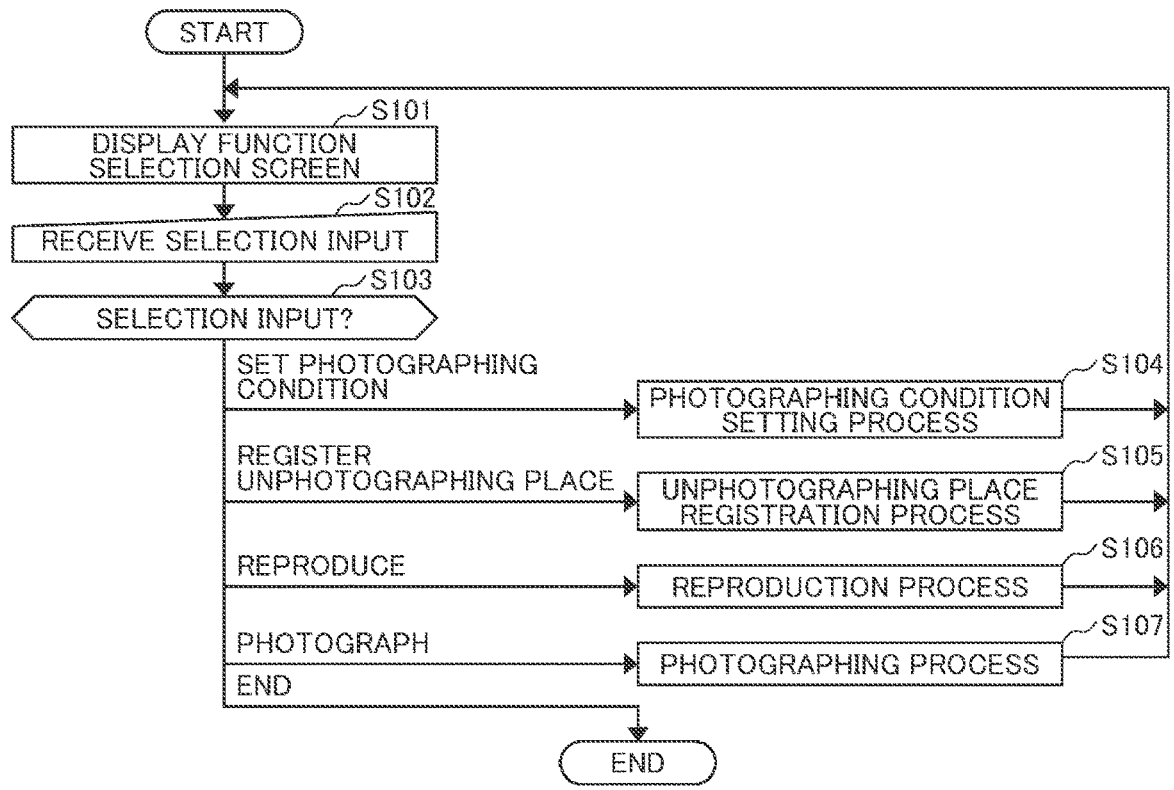
FIG. 4 is a flowchart describing an operation example of a camera function execution unit of the image recording device according to the first embodiment.
Figure 5:
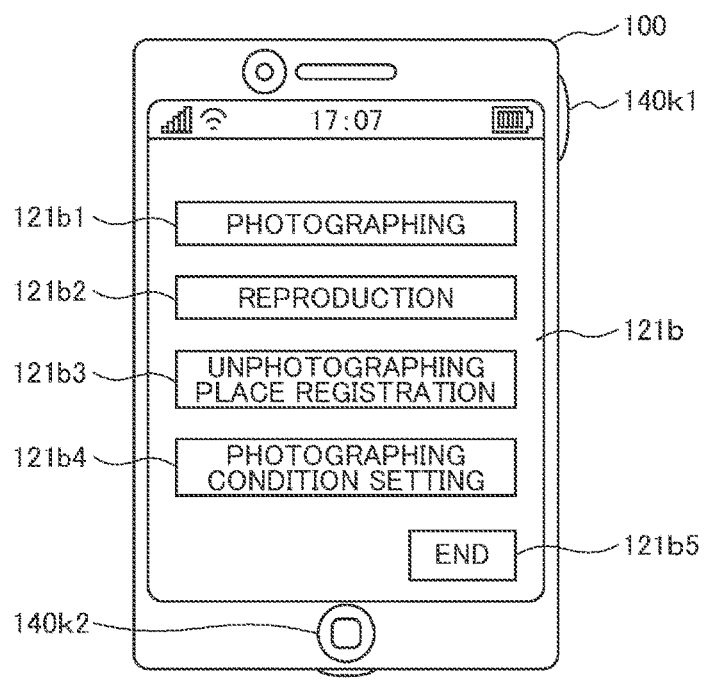
FIG. 5 is a diagram illustrating a display example of a camera function selection screen.

Referring to FIG. 4, when the icon 121a2 on the basic screen 121a of the image recording device 100 operating on the basis of the control of the basic operation execution unit 104a described above is selected by tapping or the like, the basic operation execution unit 104a activates the camera function execution unit 104b to transfer a control authority to the camera function execution unit 104b. In addition, in step S101, the camera function execution unit 104b displays the camera function selection menu screen 121b on the display unit 121 as illustrated in FIG. 5. The camera function selection menu screen 121b includes a photographing icon 121b1, a reproduction icon 121b2, an unphotographing place registration icon 121b3, a photographing condition setting icon 121b4, and an end icon 121b5. Subsequently, the camera function execution unit 104b receives a selection input for the icon of the camera function selection menu screen 121b from a user (S102) and executes a branching process S103 depending on the selected icon.

In S102, if a selection input for the end icon 121b5 is received, the camera function execution unit 104b returns the control authority to the basic operation execution unit 104a in the branching process S103. Furthermore, the basic operation execution unit 104a displays a basic screen 121a and terminates the operation of the camera function execution unit 104b.

If the selection input for the photographing condition setting icon 121b4 is received in S102, the operation branches to a photographing condition setting process S104 in the branching process S103.

Figure 6:
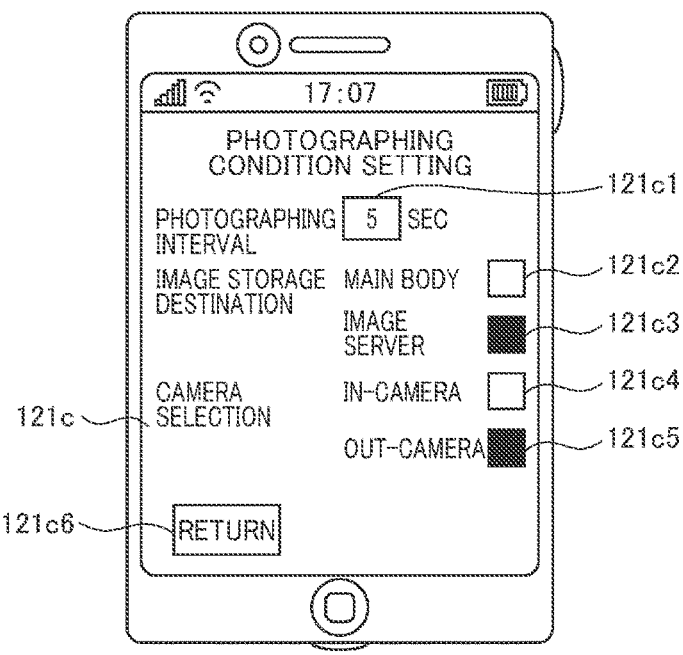
FIG. 6 is a diagram illustrating a display example of the display screen in a photographing condition setting process of FIG. 4.

In the photographing condition setting process S104, a photographing condition setting screen 121c is displayed on the display unit 121 as illustrated in FIG. 6. The photographing condition setting screen 121c includes a photographing interval setting box 121c1, a checkbox 121c2 for setting an image storage destination to the image data storage area 110c3 of the main body, a checkbox 121c3 for setting the image storage destination to the image data server 211 connected to the wide-area public network 201, a checkbox 121c4 for setting the photographing camera to in-camera, a checkbox 121c5 for setting the photographing camera to out-camera, and a return icon 121c6, so that a user is allowed to set each photographing condition setting item. The photographing interval may change depending on position information of the terminal or the used time. The image storage destination may be set to any one of the image data storage area 110c3 of the main body, the image data server 211, or both of them. In addition, the photographing camera may be set to any one of the in-camera, the out-camera, or both of them. For example, if the photographing camera is set to both the in-camera and the out-camera, it is possible to photograph front, rear, left, and right images around a user at the same time. The photographing condition set in this manner is stored in a photographing condition setting storage area 110c1 of the storage unit 110.

If a selection input for the unphotographing place registration icon 121b3 is received in S102, the operation branches to the unphotographing place registration process S105 in the branching process S103. Here, the "unphotographing place" refers to a place where no image data is transmitted, or no image data is acquired or stored as described below.

If a selection input for the reproduction icon 121b2 is received in S102, the operation branches to the reproduction process S106 in the branching process S103.

If a selection input for the photographing icon 121b1 is received in S102, the operation branches to the photographing process S107 in the branching process S103.

The operation returns to S101 after the photographing condition setting process S104, the unphotographing place registration process S105, the reproduction process S106, and the photographing process S107, so that the camera function selection menu screen 121b is displayed.

An exemplary unphotographing place registration process S105 will be described with reference to the flowchart of FIG. 7 and an example of the display screen of FIGS. 8A and 8B.

Figure 7:
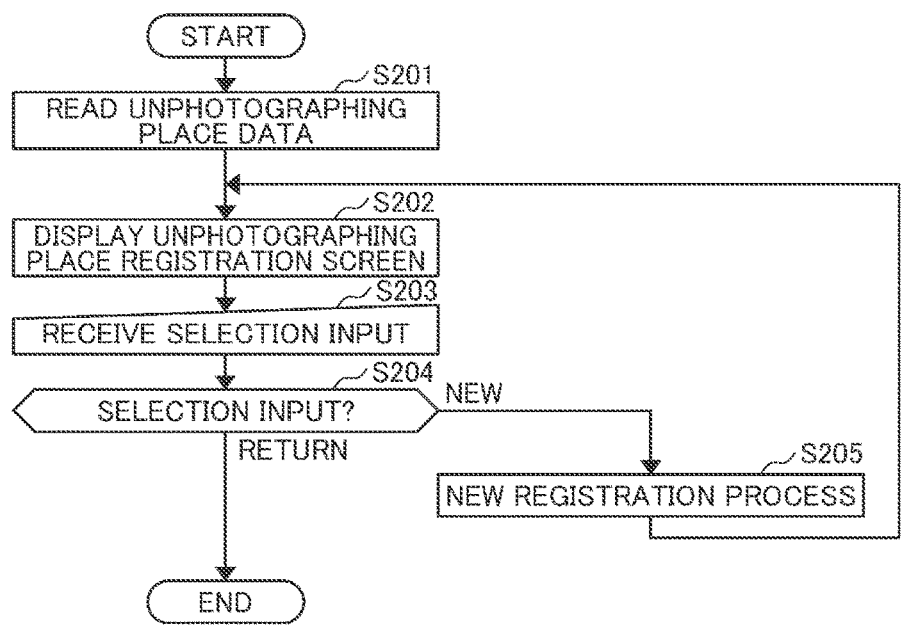
FIG. 7 is a flowchart illustrating an exemplary unphotographing place registration process of FIG. 4.

Referring to FIG. 7, in the unphotographing place registration process S105 of FIG. 4, first, the unphotographing place data is read from the unphotographing place storage area 110c2 of the storage unit 110 (S201). Next, the unphotographing place registration screen 121d is displayed (S202) as illustrated in FIG. 8A to receive a selection input for the icons of the unphotographing place registration screen 121d from a user (S203).

Figure 8A:
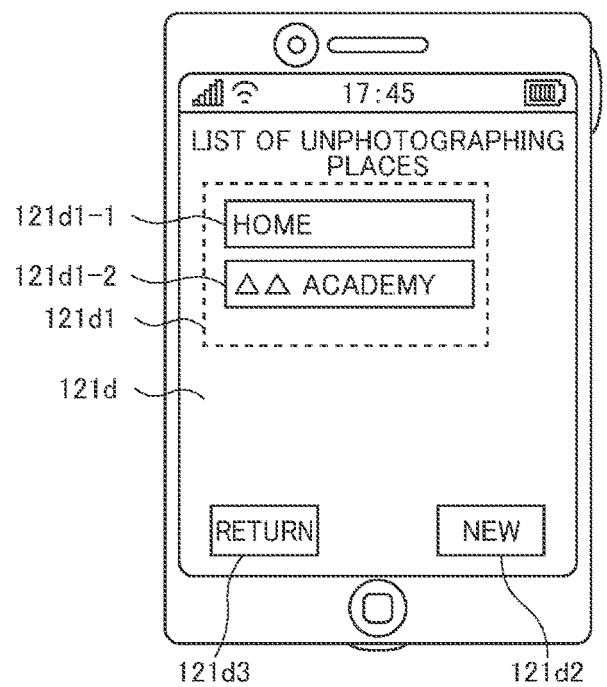
FIGS. 8A and 8B are a diagram illustrating a display example of the display screen in the unphotographing place registration process of FIG. 7.

The unphotographing place registration screen 121d of FIG. 8A includes a list 121d1 of registered unphotographing places, a new registration icon 121d2, and a return icon 121d3. According to this embodiment, two places 121d1-1 and 121d1-2 are displayed as a list 121d1 of the unphotographing places. A branching process is performed on the basis of the icon received as the selection input in S203.

If a selection input for the return icon 121d3 is received in S203, the unphotographing place registration process S105 is terminated, and the operation returns to S101 of the flowchart of FIG. 4, so that the camera function selection menu screen 121b is displayed.

If a selection input for the new registration icon 121d2 is received in S203, the operation branches to the new registration process S210 in S204, so that a new unphotographing place is registered and stored in the unphotographing place storage area 110c2 of the storage unit 110. Then, returning to S202, the unphotographing place registration screen 121d is displayed.

Figure 8B:
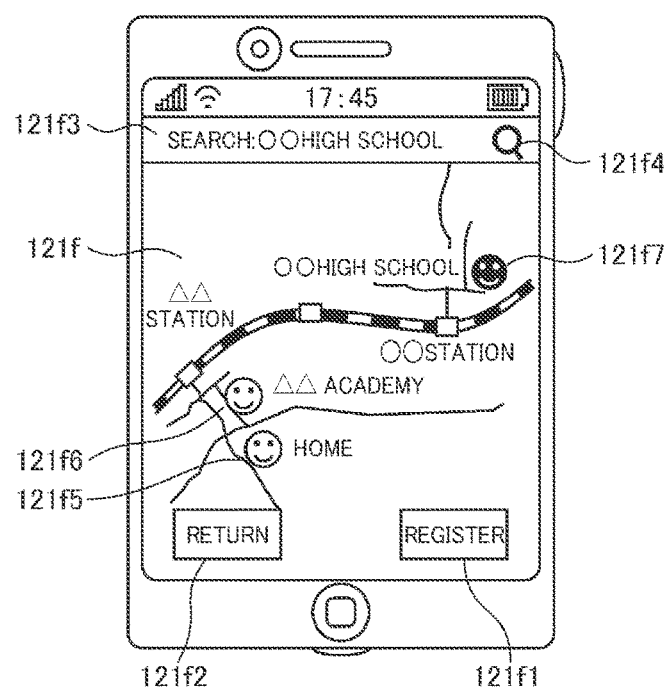

In the new registration process S205, a new registration screen 121f is displayed on the display unit 121 as illustrated in FIG. 8B. The new registration screen 121f includes a registration icon 121f1, a return icon 121f2, a search box 121f3, a search icon 121f4, marks 121f5 and 121f6 representing positions of the unphotographing places registered in advance, and an icon 121f7 representing a position of the unphotographing place newly registered in addition to a map around the registered place. Information on the place newly registered as an unphotographing place is input to the search box 121f3, and search is performed by tapping the search icon 121f4, so that the icon 121f7 is displayed in the position corresponding to the searched place along with a map around the searched place. Alternatively, the position of the icon 121f7 is shifted by moving a position of the displayed map while touching a finger on the icon 121f7 and releasing the finger in a desired registration position. The position on the map where the icon 121f7 is displayed is newly registered as a position of the unphotographing place by tapping the registration icon 121f1.

An exemplary reproduction process S106 of FIG. 4 will be described with reference to the flowchart of FIG. 9 and an example of the display screen of FIGS. 10A and 10B.

Figure 9:
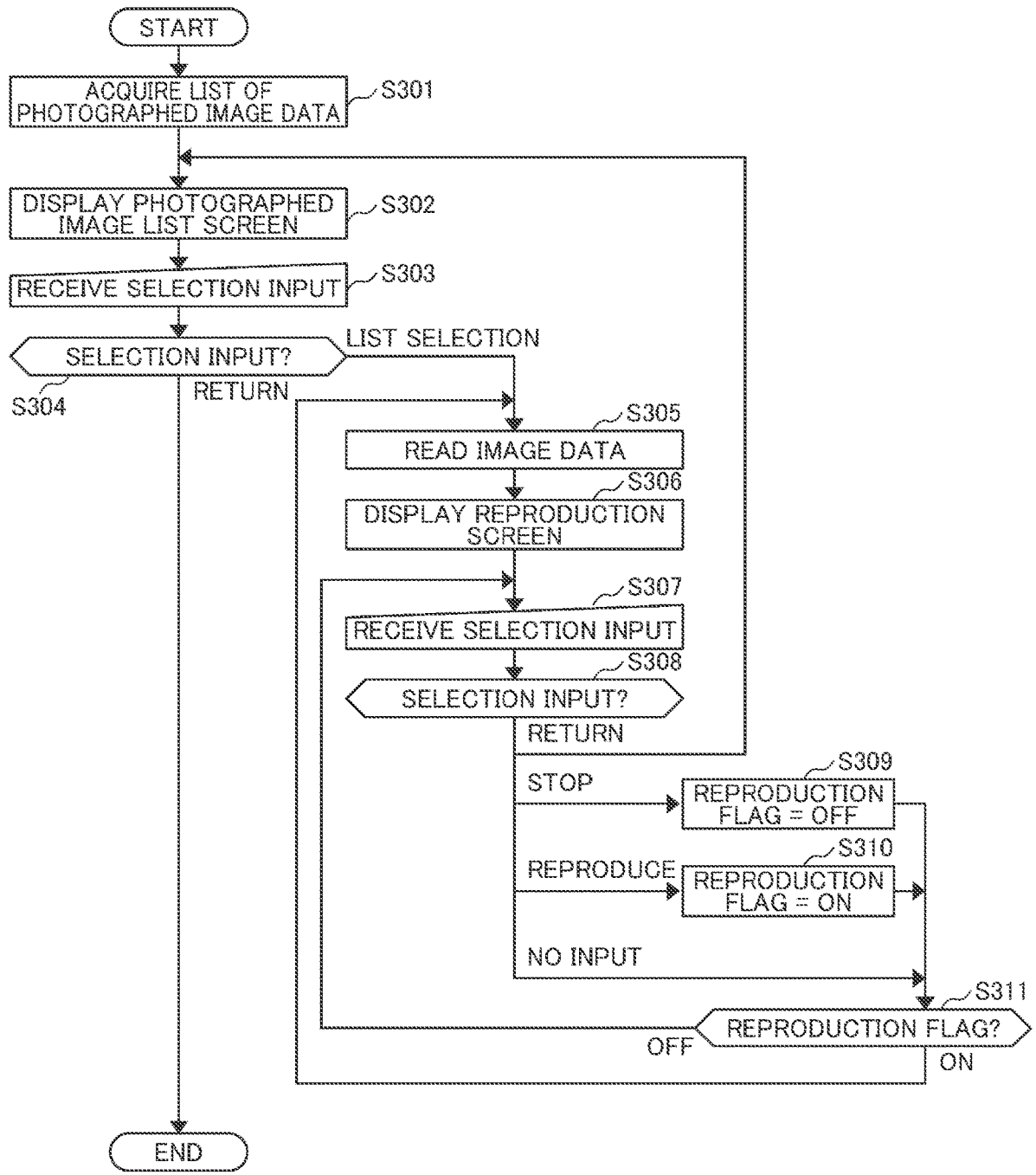
FIG. 9 is a flowchart illustrating an exemplary reproduction process of FIG. 4.
Figure 10A:
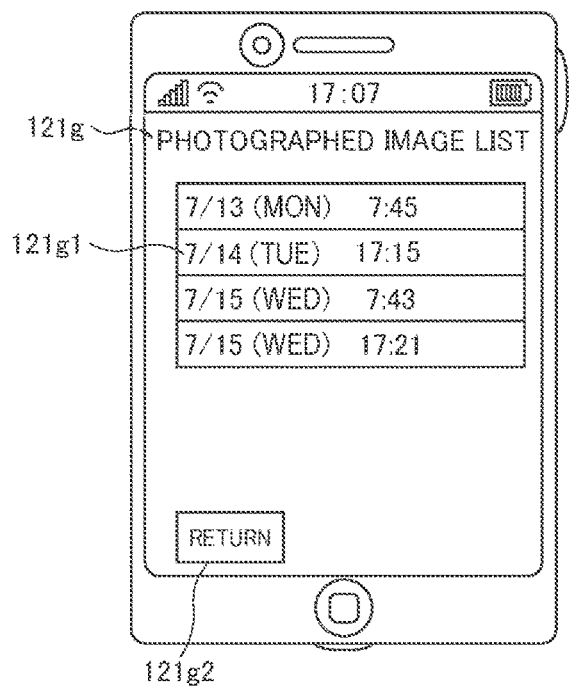
FIGS. 10A and 10B are a diagram illustrating a display example of the display screen in the reproduction process of FIG. 9.

Referring to FIG. 9, in the reproduction process S106 of FIG. 4, first, a list of the photographed image data is acquired from the image data storage area 110c3 of the storage unit 110 or the image data server 211 connected to the wide-area public network 201 (S301). Then, a photographed image list screen 121g is displayed as illustrated in FIG. 10A (S302). The photographed image list screen 121g includes a photographed image list 121g1 and a return icon 121g2. Here, the photographed image list is displayed on a daily basis.

A selection input for the icon of the photographed image list screen 121h is received from a user (S303), and a branching process is performed depending on the received selection input (S304).

If a selection input for the return icon 121g2 is received in S303, the reproduction process S106 is terminated, and the operation returns to S101 of the flowchart of FIG. 4, so that the camera function selection menu screen 121b is displayed.

Figure 10B:
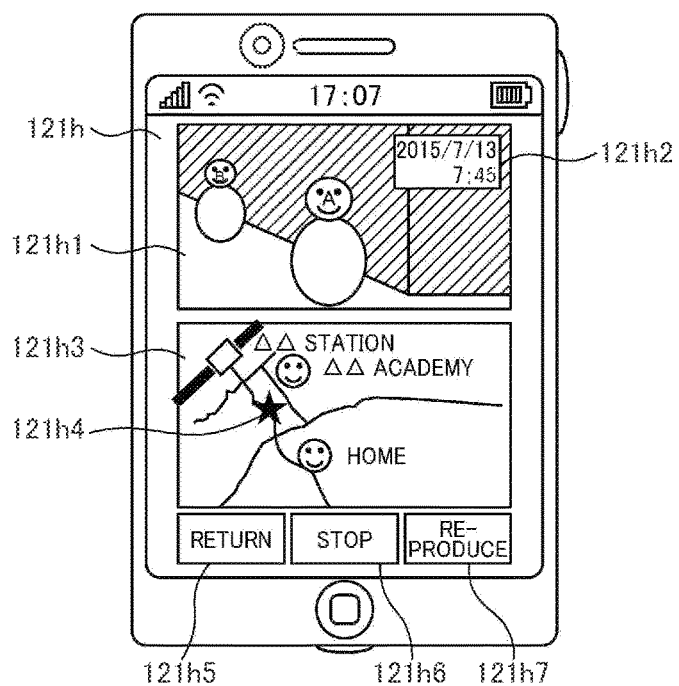

If a selection input for the photographed image list 121g1 is received in S303, the image data corresponding to the selected list are read (S305), and the reproduction screen 121h is displayed as illustrated in FIG. 10B (S306). The reproduction screen 121h includes an image display area 121h1 for displaying the read image data, a photographed date/time display area 121h2 for displaying a date/time at which the image data is acquired, a map display area 121h3 around a position where the image data is acquired, a photographing position mark 121h4 representing a position where the image data is acquired, a stop icon 121h5, a reproduction icon 121h6, and a return icon 121h7. The image data read in S305 at least includes a date/time at which the image data is acquired and data on the position where the image data is acquired as additional information. The photographed date/time display area 121h2, the map display area 121h3, and the photographing position mark 121h4 of the reproduction screen 121h are displayed on the basis of this additional information.

Then, a selection input for the icon of the reproduction screen 121h is received (S307), and a branching process is performed depending on the received selection input (S308).

If the selection input for the return icon 121h7 is received in S308, the operation returns to S302, so that the photographed image list screen 121h is displayed.

If a selection input for the stop icon 121h5 is received in S308, a reproduction flag is set to OFF (S309), and the operation advances to the branching process S311.

If a selection input for the reproduction icon 121b2 is received in S308, the reproduction flag is set to ON (S310), and the operation advances to the branching process S311.

If there is no selection input in S308, the operation advances to the branching process S311.

In S311, the branching process is performed depending on the reproduction flag. If the reproduction flag is set to OFF, the operation returns to S307, so that a selection input for the icon of the reproduction screen 121h is received. If the reproduction flag is set to ON, the operation returns to S305, and the next image data is read.

Figure 11:
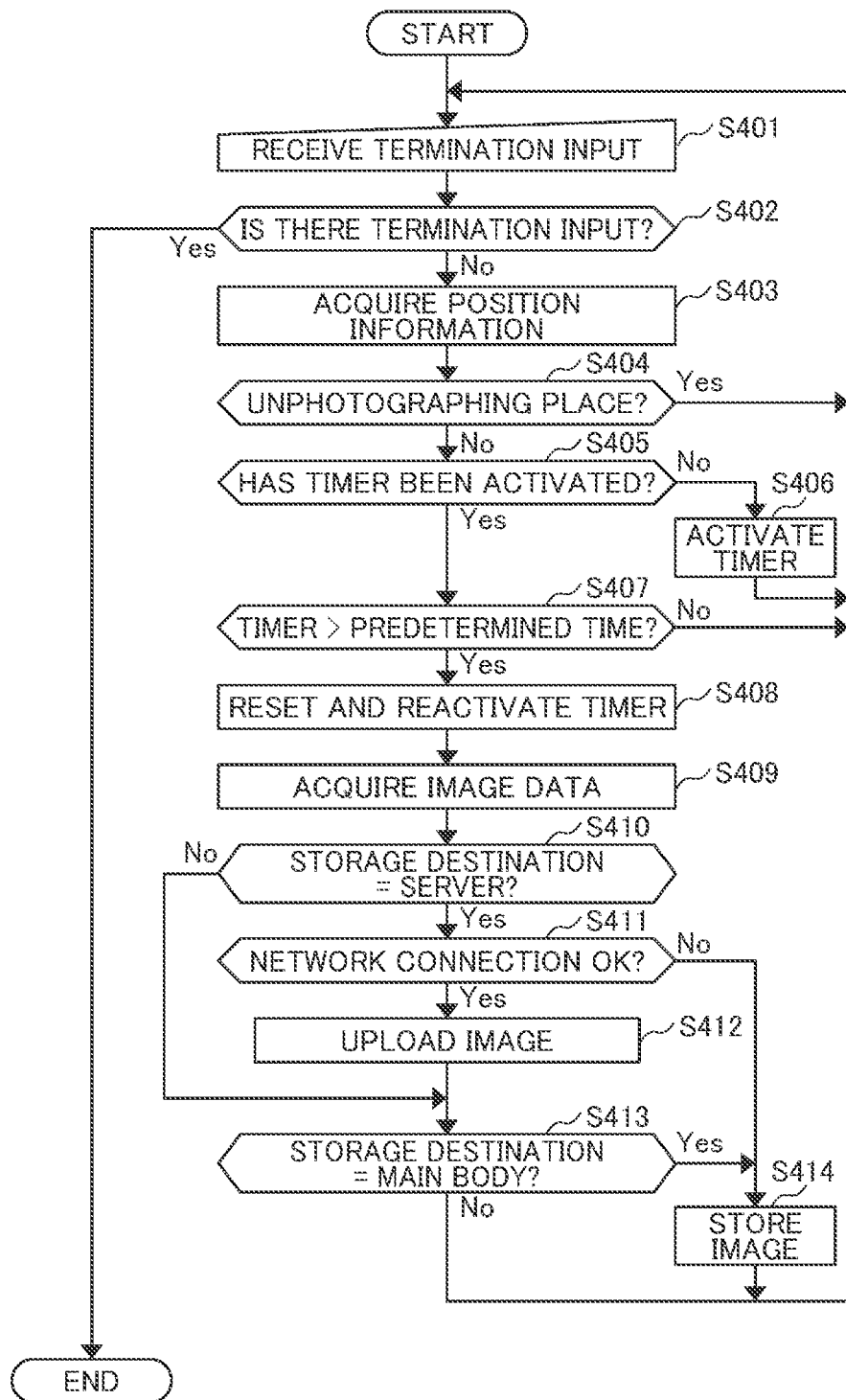
FIG. 11 is a flowchart illustrating an exemplary photographing process of FIG. 4.

Next, the photographing process S107 of FIG. 4 will be described with reference to an exemplary flowchart of FIG. 11. Referring to FIG. 11, a termination input for the photographing process is received (S401). The termination input is received, for example, by displaying an end icon on the display unit 121 and allowing a user to tap the displayed icon, or the like.

Then, the branching process is performed depending on whether or not there is a termination input. If the termination input is received in S401 (Yes), the photographing process S107 is terminated, and the operation returns to S101 of the flowchart of FIG. 4, so that the camera function selection menu screen 121b is displayed.

If the termination input is not received in S401 (No), the position information acquirement execution unit 104c acquires position information on the basis of a position computation signal received by the GPS receiver unit 161 (S403).

Then, a branching process is performed depending on whether or not a current position of the image recording device 100 acquired in S403 is within a predetermined distance from the unphotographing place (for example, within 50 m) on the basis of the information on the unphotographing place registered in S105 (S404). If the current position is within a predetermined distance from the unphotographing place (Yes), the operation returns to S401. If the current position is out of a predetermined distance from the unphotographing place (No), a branching process is performed depending on whether or not a timer is activated (S405). If the timer is activated (Yes), the operation advances to a branching process S407. If the timer is not activated (No), the timer is activated (S406), and the operation returns to S401.

In S407, a branching process is performed depending on whether or not the timer value is equal to or longer than a predetermined period of time on the basis of the photographing interval stored in the photographing condition setting storage area 110c1 of the storage unit 110. If the timer value is equal to or shorter than the predetermined period of time (No), the operation returns to S401. If the timer value exceeds the predetermined period of time (Yes), the timer is reset and reactivated (S408).

Then, image data is acquired from the selected camera depending on the camera selection in the photographing condition setting stored in the photographing condition setting storage area 110c1 of the storage unit 110 (S409), and a branching process is performed depending on the image data storage destination setting set in the photographing condition (S410).

In S410, a branching process is performed depending on whether or not the image data server 211 connected to the wide-area public network 201 is selected as the image data storage destination. If the image data server is not selected as the storage destination (No), the operation advances to S414. If the image data server is selected as the storage destination (Yes), a branching process is performed depending on a connection situation to the wide-area public network (S411). If the connection to the wide-area public network is not established (No), the operation advances to S414. If the connection to the wide-area public network is established (Yes), the position information acquired in S403, the photographing time information, or the like are transmitted and uploaded to the image data server 211 by adding them to the image data acquired in S409 (S412).

In S413, a branching process is performed depending on whether or not the image data storage area 110c3 of the storage unit 110 is selected as the image data storage destination. If the image data storage area 110c3 is not selected as the storage destination (No), the operation returns to S401. If the image data storage area 110c3 is selected as the storage destination (Yes), the operation advances to S414.

In S414, the position information acquired in S403, the photographing time information, and the like are added to the image data acquired in S409, and are stored in the storage area 110c3. Then, the operation returns to S401.

By virtue of the camera function of the image recording device 100 described above, when a user gets out of the place registered as the unphotographing place such as a home by a predetermined distance, the photographed image data and information on the photographing place can be stored in the image data server or the image data storage area 110c3. In addition, since the image data and the information on the photographed place or the like are not stored when a user stays within a predetermined distance from the unphotographing place such as a home, it is possible to prevent the image data from being unnecessarily transmitted to the image data server and thus prevent an increase of the communication traffics or an increase of the capacity of the image data storage area 110c3 even when a user forgets to terminate the photographing.

Note that, when a network connection is not established in the setting for storing the image data in the image data server, the photographed image data is stored in the image data storage area 110c3. Alternatively, the image stored in the image data storage area 110c3 may be uploaded to the image data server during the photographing process or when a network connection is established after the photographing process.

In the aforementioned example, storing the image in the image data server or the image data storage area stops when a user moves to a predetermined distance range from the unphotographing place, for example, when a user goes back to the home from a visiting destination. Alternatively, storing the image is continuously performed for a predetermined period of time when a user moves out of a predetermined distance range from the unphotographing place. As a result, even when there is an ambush or a thief in a home, it is possible to store an image of the criminal.

In the aforementioned description, the position information acquirement execution unit 104c acquires the position information on the basis of the position computation signal received by the GPS receiver unit 161. Alternatively, without limiting thereto, the position information may be acquired by using information on a service set identifier (SSID) of the radio communication access point 202 provided in a home or school acquired by the LAN communication unit 151 as the position computation signal. In addition, whether or not a user is placed in a predetermined distance range from the unphotographing place may be determined depending on whether or not the SSID of the radio communication access point 202 installed in a home or a school can be detected.

The photographing is terminated in response to the termination input of S401. Alternatively, the photographing may be terminated when a user moves to a predetermined distance range from the unphotographing place.

Any one, any combination, or all of the photographing, storing the image data in the main body, transmission of the image data, and storing the image data in the image data server may be controlled depending on the unphotographing place.

As described above, according to this embodiment, the information processing device includes an image input unit that acquires image data from an optical image, a signal receiver unit that acquires a position computation signal, a communication unit that transmits the image data, a first memory unit that stores position information regarding a place where no image data is transmitted, and a control unit that controls execution of transmission of the image data on the basis of the position information acquired from the position computation signal and the position information stored in the first memory unit.

In addition, a method for controlling image data of an information processing device that acquires image data and transmits the acquired image data using a communication unit includes acquiring position information of the information processing device, and controlling execution of transmission of the image data on the basis of the acquired position information and position information stored in advance regarding a place where no image data is transmitted.

As a result, it is possible to provide an information processing device capable of realizing more suitable usability.

Second Embodiment

This embodiment is to prevent a monitoring image around a user's body from being not photographed depending on setting of a camera used in the photographing process S107 of FIG. 4, an installation state of the image recording device 100, or the like.

Figure 12:
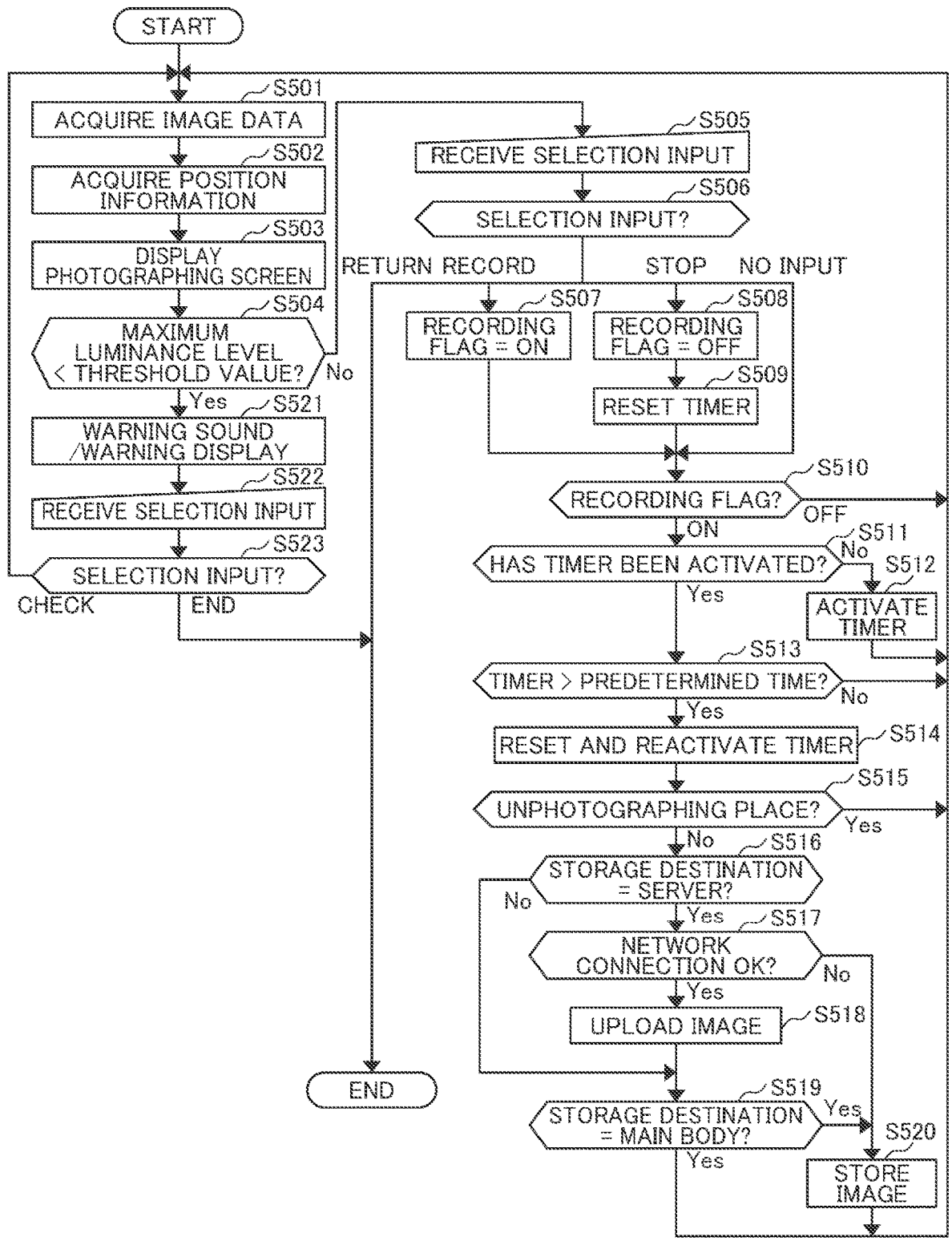
FIG. 12 is a flowchart illustrating an exemplary photographing process according to a second embodiment.
Figure 13A:
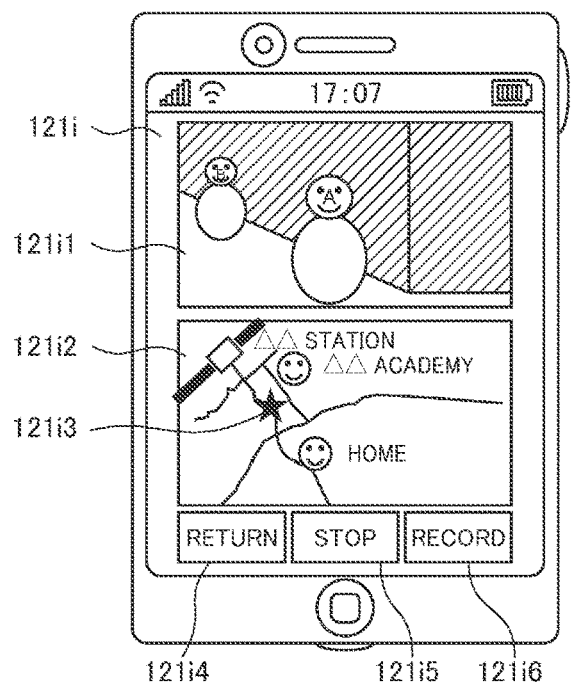
FIGS. 13A and 13B are a diagram illustrating a display example of the display screen of the photographing process of FIG. 12.
Figure 13B:
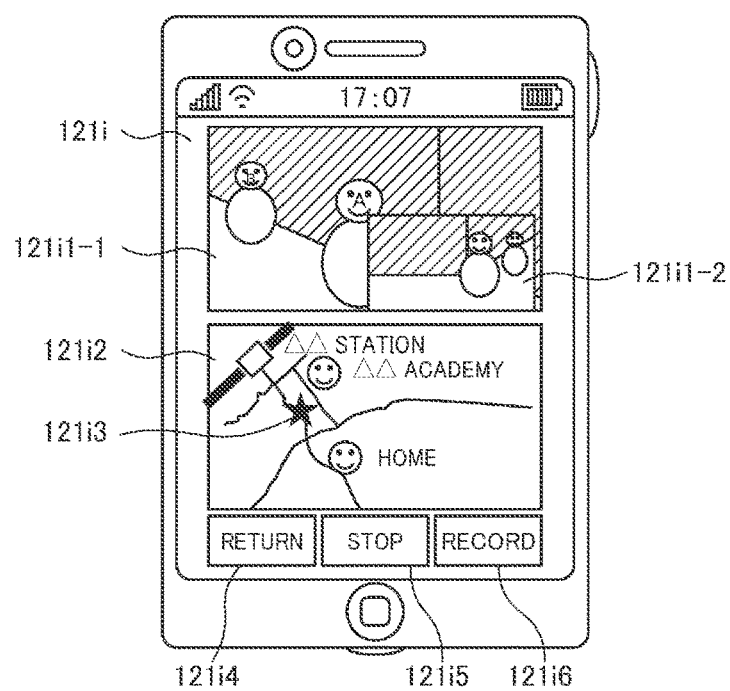

A photographing process S107 according to this embodiment will be described with reference to the flowchart of FIG. 12. Referring to FIG. 12, in the photographing process S107 of FIG. 4, first, image data are acquired from the selected camera depending on the camera selection in the photographing condition setting stored in the photographing condition setting storage area 110c1 of the storage unit 110 (S501). In addition, the position information acquirement execution unit 104c acquires position information on the basis of the signal received by the GPS receiver unit 161 (S502). Then, the photographing screen 121i is displayed on the basis of the acquired image data and the position information as illustrated in FIGS. 13A and 13B (S503). The photographing screen 121i has an image display area 121i1 for displaying the image data acquired from the selected camera, a map display area 121i2 for displaying a position of the image recording device 100 on the basis of the position information acquired by the position information acquirement execution unit 104c, a photographing position mark 121i3, a return icon 121i4, a stop icon 121i5, and a record icon 121i6. Here, if any one of the in-camera and the out-camera is selected in the camera selection of the photographing condition setting, the image acquired from any one of the cameras set as illustrated in FIG. 13A is displayed on the image display area 121i1. In addition, if both the in-camera and the out-camera are selected, the images acquired from both the cameras as illustrated in FIG. 13B are displayed on the image display areas 121i1-1 and 121i1-2.

Figure 14A:
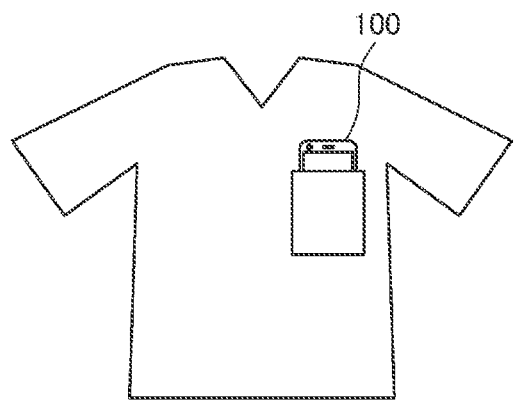
FIGS. 14A and 14B are a diagram illustrating an exemplary installation state of the image recording device according to the second embodiment.

Then, a maximum luminance level of the acquired image data is checked, and a branching process is performed (S504). For example, if a user puts the image recording device 100 into his pocket while setting the out-camera as illustrated in FIG. 14A, the out-camera is hidden, so that the luminance level of the acquired image becomes very low. In this regard, if the maximum luminance level of the acquired image is equal to or lower than a predetermined threshold value (Yes), a warning sound is generated, and a warning screen 121j is displayed in order to prompt a user to check the setting of the camera used in the photographing, the installation state of the image recording device 100, and the like (S522). FIG. 15 illustrates an exemplary configuration of the warning screen 121j. The warning screen 121j has a checkbox 121j1 for setting the camera used in the photographing as the in-camera, a checkbox 121j2 for setting the camera used in the photographing as the out-camera, an end icon 121j3, and a check icon 121j4.

Figure 14B:
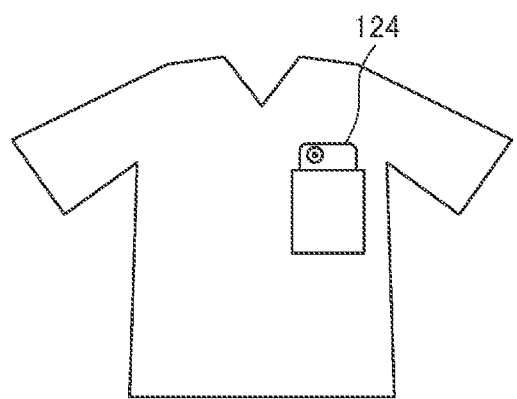

For example, if the warning screen 121j is displayed while the out-camera is hidden as illustrated in FIG. 14A, the checkbox 121j1 for setting the camera used in the photographing as the in-camera is selected. Alternatively, as illustrated in FIG. 14B, an installation state by which the out-camera can be used in the photographing is set.

Then, a selection input for an icon included in the warning screen 121*j* is received (S523), and the branching process is performed depending on the received selection input (S524).

If the check icon 121*j*4 is selected and received in the process of receiving the selection input S523, the operation returns to S501, and the image data is acquired from the selected camera.

If the end icon 121*j*3 is selected and received in the process S523 of receiving the selection input, the photographing process S107 is terminated, and the operation returns to S101 as illustrated in the flowchart of FIG. 4, so that the camera function selection menu screen 121*b* is displayed.

If the maximum luminance level of the image acquired in S501 is equal to or higher than a predetermined threshold value (No) in the branching process of S504, a selection input for an icon included in the photographing screen 121*i* is received (S505), and a branching process is performed depending on the received selection input (S506).

If a selection input for the return icon 121*i*4 is received in S505, the photographing process S107 is terminated, and the operation returns to S101 illustrated in the flowchart of FIG. 4, so that the camera function selection menu screen 121*b* is displayed.

If a selection input for the record icon 121*i*6 is received in S505, the record flag is set to "ON", and the operation advances to the branching process S510.

If a selection input for the stop icon 121*i*5 is received in S505, the record flag is set to "OFF", and the timer is reset (S509). Then, the operation advances to the branching process S510.

If there is no selection input in S505, the operation advances to the branching process S510.

In S510, a branching process is performed depending on the recording flag. If the recording flag is set to "OFF", the operation returns to S501, so that the image data is acquired from the selected camera. If the recording flag is set to "ON", a branching process is performed depending on whether or not the timer is activated (S511). If the timer is activated (Yes), the operation advances to the branching process S513. If the timer is not activated (No), the timer is activated (S512), and the operation returns to S501.

In S513, a branching process is performed depending on whether or not the timer value is equal to or longer than a predetermined period of time on the basis of the photographing interval setting stored in the photographing condition setting storage area 110*c*1 of the storage unit 110. If the timer value is equal to or shorter than the predetermined period of time (No), the operation returns to S501. If the timer value exceeds the predetermined period of time (Yes), the timer is reset and reactivated (S514).

Then, a branching process is performed depending on whether or not the current position of the image recording device 100 acquired in S502 is within a predetermined distance range from the unphotographing place on the basis of the information on the registered unphotographing place (S515). If the current position is within a predetermined distance range from the unphotographing place (Yes), the operation returns to S501. If the current position is out of the predetermined distance range from the unphotographing place (No), a branching process is performed depending on the setting of the storage destination of the image data set as the photographing condition (S516).

In S516, a branching process is performed depending on whether or not the image data server 211 connected to the wide-area public network 201 is selected as the storage destination of the image data. If the image data server is not selected as the storage destination (No), the operation advances to S519. If the image data server is selected as the storage destination (Yes), a branching process is performed depending on a connection situation to the wide-area public network (S517). If the connection to the wide-area public network is not established (No), the operation advances to S520. If the connection to the wide-area public network is established (Yes), the position information acquired in S502, the information on the photographing timing, and the like are added to the image data acquired in S501 and are uploaded to the image data server 211 (S518).

In S519, a branching process is performed depending on whether or not the image data storage area 110*c*3 of the storage unit 110 is selected as the image data storage destination. If the image data storage area 110*c*3 is not selected as the storage destination (No), the operation returns to S501. If the image data storage area 110*c*3 is selected as the storage destination (Yes), the operation advances to S520.

In S520, the position information acquired in S502, the information the photographing timing, or the like are added to the image data acquired in S501, and are stored in the image data storage area 110*c*3. Then, the operation returns to S501.

In this embodiment, if the maximum luminance level of the acquired image is equal to or lower than a predetermined threshold value, in S521, a warning sound is generated, and warning screen 121*j* is displayed in order to prompt a user to check the setting of the camera used in the photographing, the installation state of the image recording device 100, and the like. Alternatively, selection of the camera may also be automatically switched.

If the second image input unit 124 is provided separately from the image recording device 100, and a camera connected to the image recording device 100 via wired or wireless communication is employed, the connection of the camera may be checked when the photographed image is acquired in S501. Then, if the camera is not connected, the warning sound may be generated, and the warning screen may be displayed.

Third Embodiment

This embodiment is to cope with a case where a user performs photographing, for example, for a route from a home to a school. In this case, a section where the user uses a train or the like in the middle of the route is set as the unphotographing place.

Figure 16:
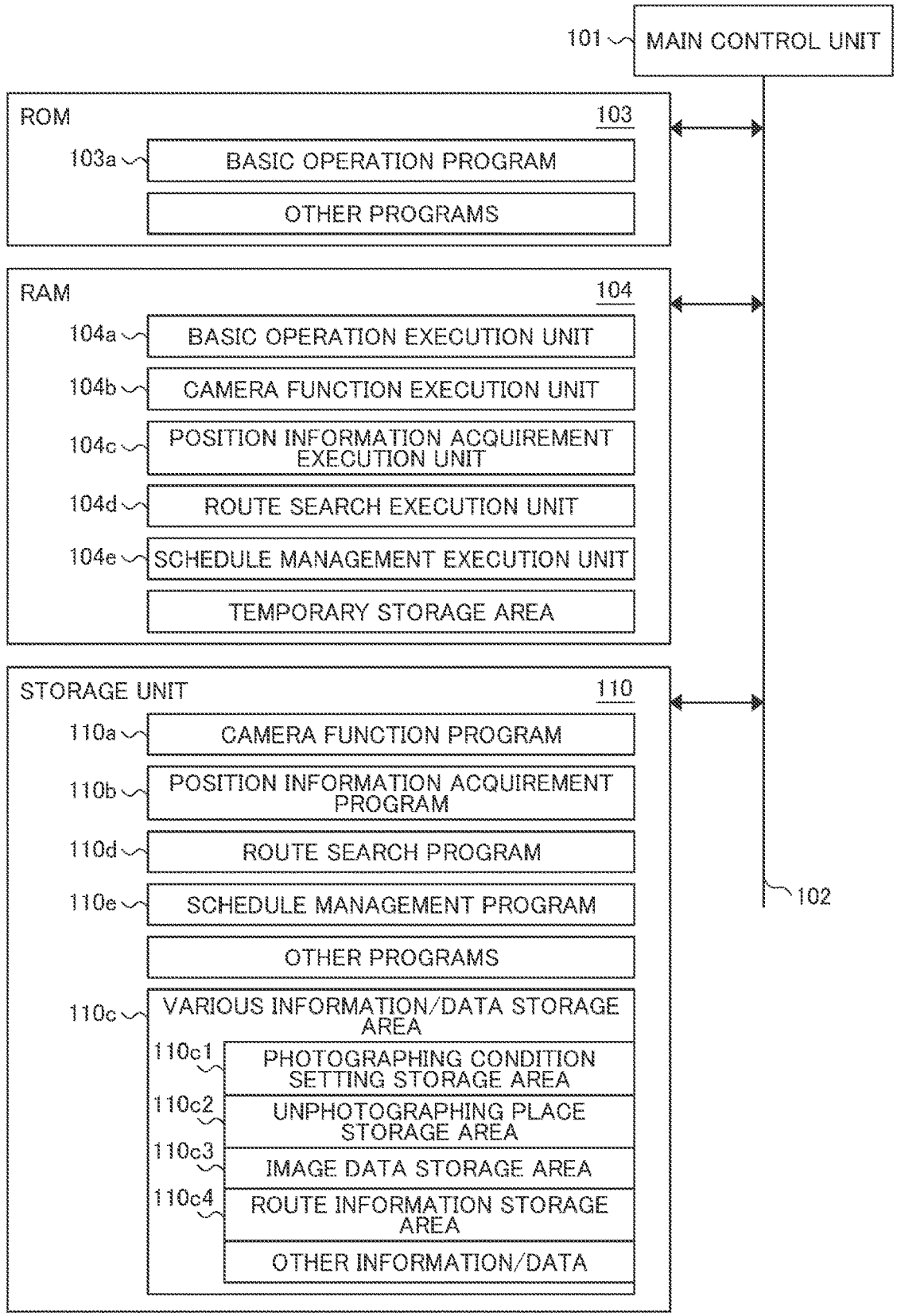
FIG. 16 is a diagram illustrating an exemplary software configuration of an image recording device according to a third embodiment.

FIG. 16 is a software configuration diagram illustrating the image recording device 100 according this embodiment. Like reference numerals denote like elements as in FIG. 1B, and they will not be described repeatedly.

Referring to FIG. 16, a route search program 110*d* and a schedule management program 110*e* stored in the storage unit 110 are deployed on the RAM 104 and are executed by the main control unit 101, so as to provide a route search execution unit 104*d* and a schedule management execution unit 104*e*. In addition, a route information storage area 110*c*4 for storing the route information is provided in the storage unit 110. The schedule management execution unit 104*e* generates an interrupt depending on a schedule interrupt setting described below, or a condition such as a setting time and a day of week.

Figure 17:
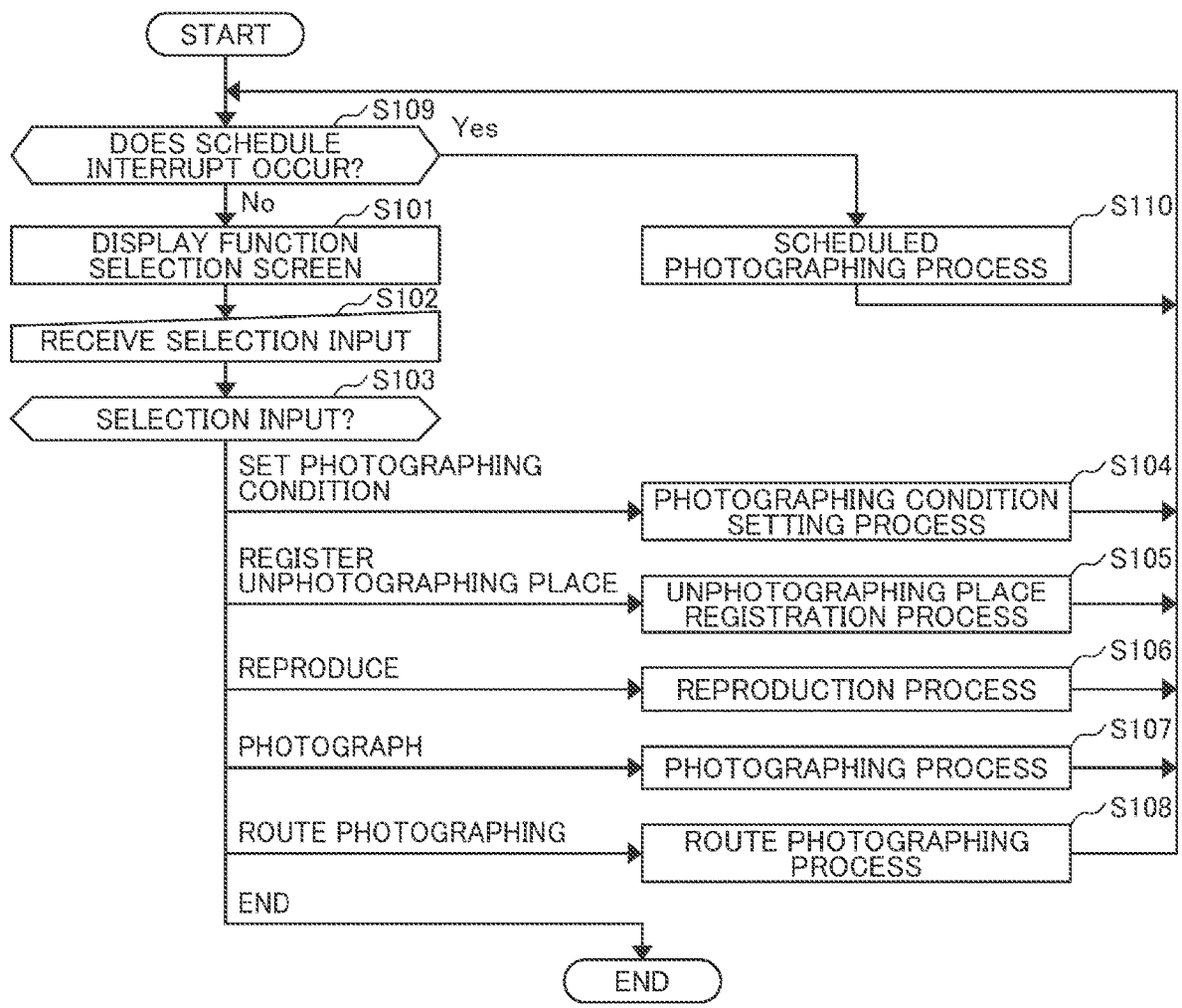
FIG. 17 is a flowchart describing an operation example of a camera function execution unit of the image recording device according to the third embodiment.
Figure 18:
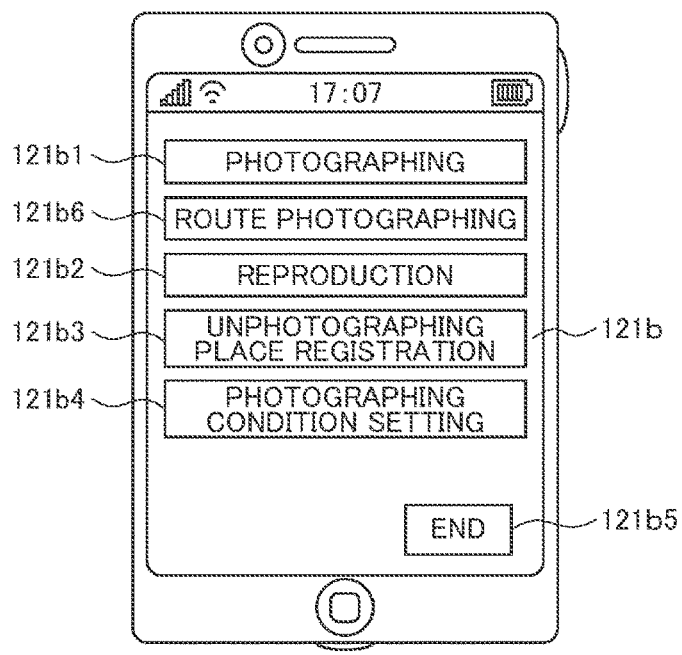
FIG. 18 is a diagram illustrating a display example of the camera function selection screen of FIG. 17.

In the following description, operations of the camera function characterizing the image recording device 100 according to this embodiment will be described with reference a flowchart of FIG. 17 and a screen display example of FIG. 18. In FIGS. 17 and 18, like reference numerals denote like elements as in FIGS. 4 and 5, and they will not be described repeatedly.

Referring to FIG. 17, as an icon 121*a*2 on the basic screen 121*a* of the image recording device 100 that operates in response to a control of the basic operation execution unit 104*a* described above is selected by tapping or the like, the basic operation execution unit 104*a* activates the camera function execution unit 104*b*, and transfers a control authority to the camera function execution unit 104*b*. In addition, in step S109, the camera function execution unit 104*b* performs a branching process by checking whether or not an interrupt occurs by the schedule management execution unit 104*e*. If a schedule interrupt occurs (Yes), the scheduled photographing process is executed (S110). If no schedule interrupt occurs (No), the camera function selection screen 12*b* is displayed on the display unit 121 as illustrated in FIG. 18 (S101). The camera function selection screen 121*b* includes a photographing icon 121*b*1, a route photographing icon 121*b*6, a reproduction icon 121*b*2, an unphotographing place registration icon 121*b*3, a photographing condition setting icon 121*b*4, and an end icon 121*b*5.

The camera function execution unit 104*b* receives a selection input for an icon included in the camera function selection menu screen 121*b* from a user (S102) and executes the branching process S103 depending on the selected icon.

If a selection input for the end icon 121*b*5 is received in S102, the camera function execution unit 104*b* transfers a control authority to the basic operation execution unit 104*a* in the branching process S103. In addition, the basic operation execution unit 104*a* displays the basic screen 121*a* and terminates the operation of the camera function execution unit 104*b*.

If a selection input for the photographing condition setting icon 121*b*4 is received in S102, the operation branches to the photographing condition setting process S104 in the branching process S103.

If a selection input for the unphotographing place registration icon 121*b*3 is received in S102, the operation branches to the unphotographing place registration process S105 in the branching process S103.

If a selection input for the reproduction icon 121*b*2 is received in S102, the operation branches to the reproduction process S106 in the branching process S103.

If a selection input for the photographing icon 121*b*1 is received in S102, the operation branches to the photographing process S107 in the branching process S103.

If a selection input for the route photographing icon 121*b*6 is received in S102, the operation branches to the route photographing process S108 in the branching process S103.

The operation returns to S109 after executing the photographing condition setting process S104, the unphotographing place registration process S105, the reproduction process S106, the photographing process S107, the route photographing process S108, and the scheduled photographing process S110.

Figure 19:
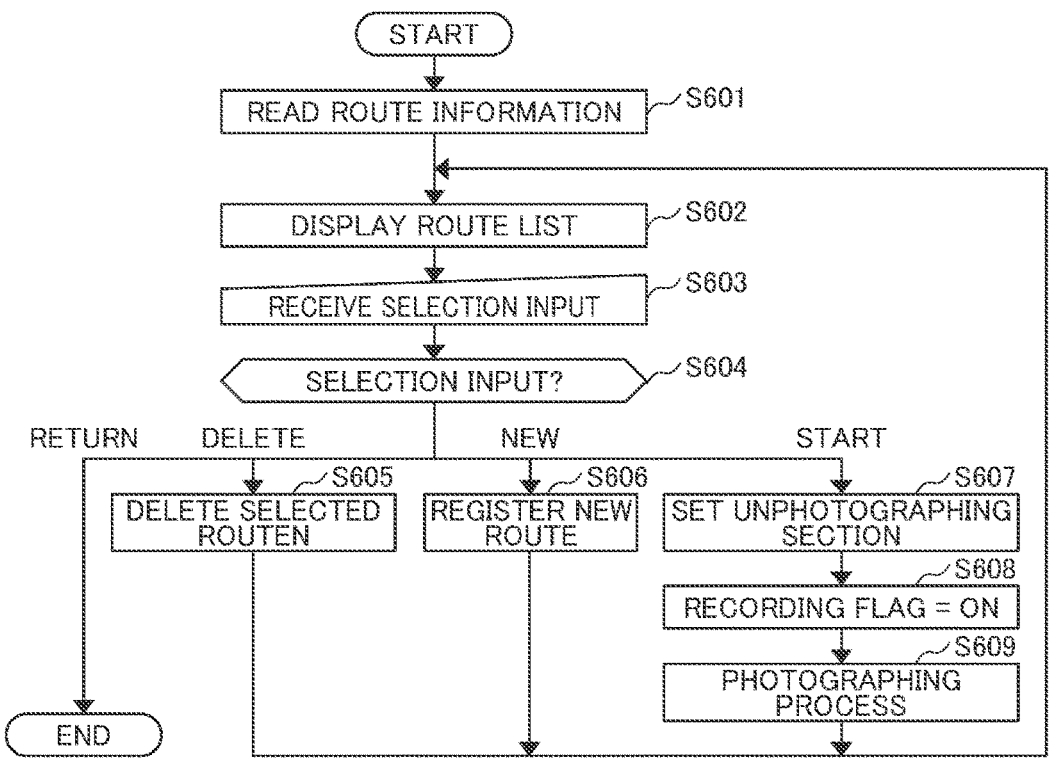
FIG. 19 is a flowchart illustrating an example of the route photographing process of FIG. 17.

The route photographing process S108 will be described with reference to an exemplary flowchart of FIG. 19. Referring to FIG. 19, first, the route information is read from the route information storage area 110*c*4 of the storage unit 110 (S601). Then, a route list screen 121*k* is displayed on the display unit 121 as illustrated in FIG. 20 (S602). The route list screen 121*k* includes a registered route list 121*k*1, a delete icon 121*k*2, a new route icon 121*k*3, a return icon 121*k*4, and a start icon 121*k*5.

Then, the camera function execution unit 104*b* receives a selection input for an icon included in the route list screen 121*k* from a user (S603), and executes the branching process S604 depending on the selected icon.

If a selection input for the return icon 121*k*4 is received in S603, the route photographing process S108 is terminated as a result of the branching process S604. Then, the operation returns to S101 of FIG. 17, and the camera function selection menu screen 121*b* is displayed.

If a selection input for the delete icon 121*k*2 is received in S603, a registration of the route selected from the route list 121*k*1 is deleted from the route information storage area 110*c*4 (S605). Then, the operation returns to S602, and the route list screen 121*k* is displayed.

A route of the route list 121*k*1 may be selected, for example, by tapping a predetermined region on the touch panel 140*t* corresponding to a position on the display unit 121 where the route to be selected is displayed. Alternatively, the selection may be performed by manipulating a manipulation key such as a cross cursor key and a selection key (not shown). In FIG. 20, a "GO-TO-SCHOOL" route 121*k*-1 is selected from the route list 121*k*1 and is distinguished, for example, by changing a color of the displayed route.

If a selection input for the new route icon 121*k*3 is received in S603, the operation branches to the new route registration process S606 described below in S604, so that a new route is registered and is stored in the route information storage area 110*c*4 of the storage unit 110. Then, the operation returns to S602, and the route list screen 121*k* is displayed.

If a selection input for the start icon 121*k*5 is received in S603, an unphotographing section is set in a route selected from the route list 121*k*1 on the basis of the route information read in S601 and is stored in the route information storage area 110*c*4 (S607). Then, the recording flag is set to "ON" (S608), and the operation advances to the photographing process S609. Here, the photographing process S609 is similar to the photographing process S107 described in conjunction with the flowchart of FIG. 12, and it will not be described repeatedly. Here, in S515, the branching process is performed depending on whether or not the position acquired in S502 is within a predetermined distance range from the unphotographing section set in S607, and within a predetermined distance range from the unphotographing place stored in the unphotographing place storage area 110*c*2 of the storage unit 110.

Figure 21:
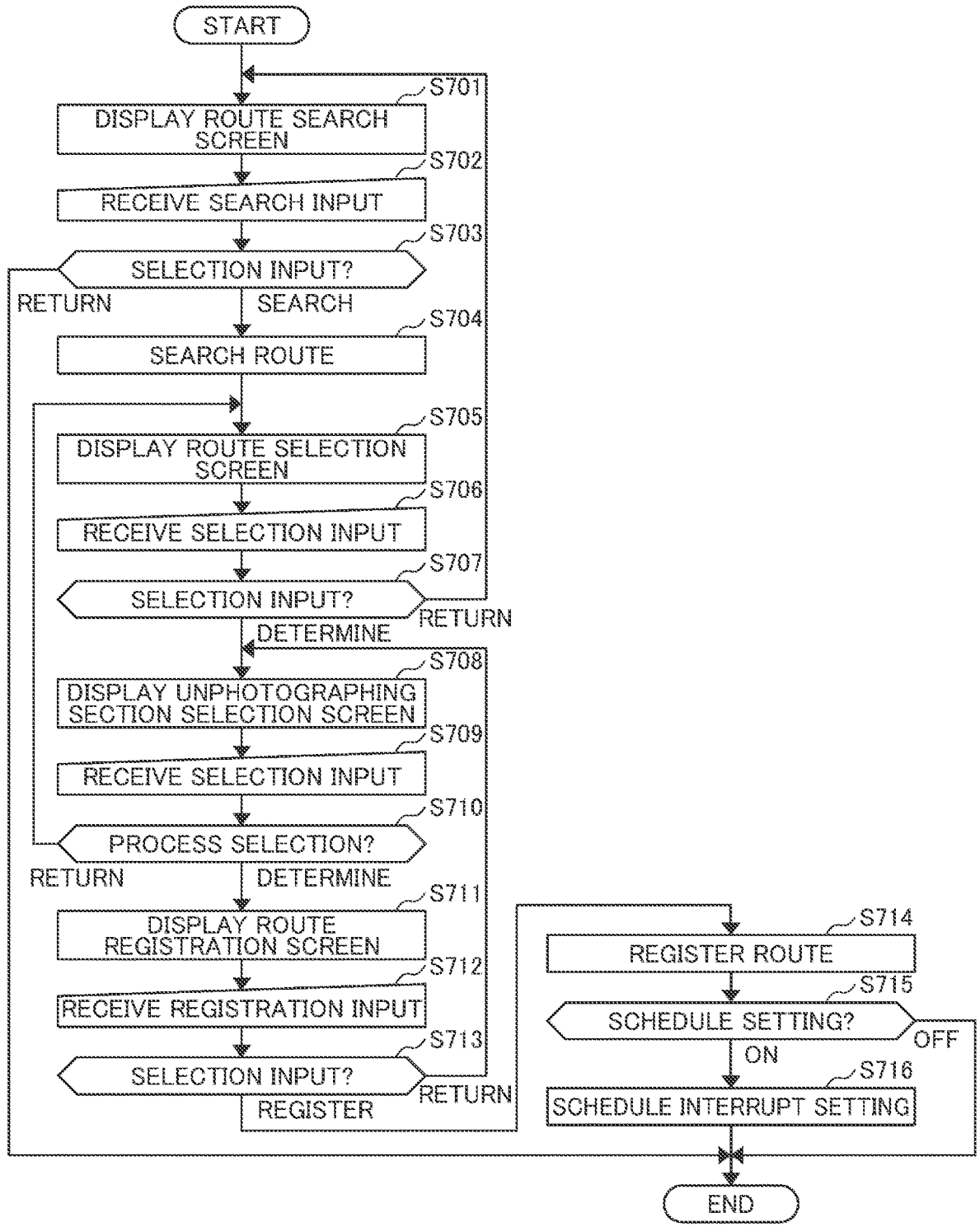
FIG. 21 is a flowchart illustrating an exemplary new route registration process of FIG. 19.
Figure 22A:
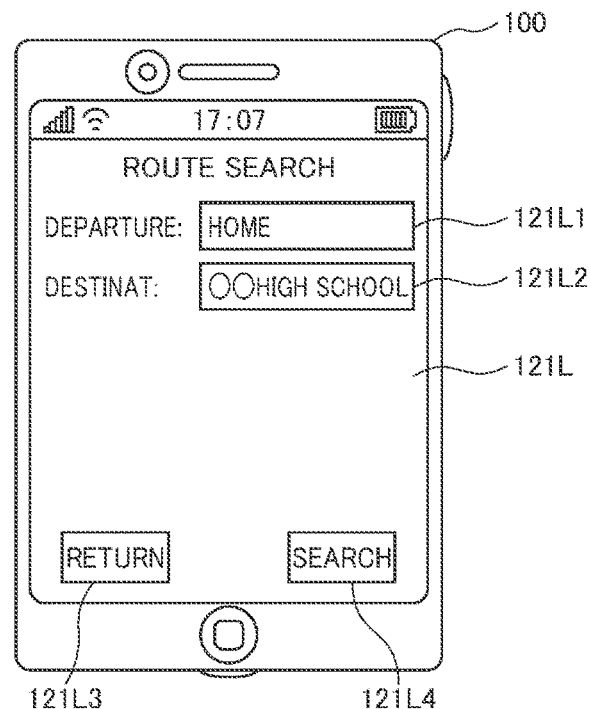
FIGS. 22A to 22D are a diagram illustrating a display example of a display screen in the new route registration process of FIG. 21.

The new route registration process S606 will be described with reference to an exemplary flowchart of FIG. 21. Referring to FIG. 21, in the new route registration process S606, first, a route search screen 121L for inputting a departure and a destination of the route is displayed as illustrated in FIG. 22A (S701). The route search screen 121L includes, for example, a departure input box 121L1, a destination input box 121L2, a return icon 121L3, and a search icon 121L4.

Then, inputs for the departure input box 121L1 and the destination input box 121L2 included in the route search screen 121L and a selection input for an icon are received from a user (S702). A branching process is performed depending on the received selection input (S703).

If a selection input for the return icon 121L3 is received in S702, the new route registration process S606 is terminated, and the operation returns to S602 illustrated in the flowchart of FIG. 19, so that the route list screen 121*k* is displayed.

If a selection input for the search icon 121L4 is received in S702, a route search is performed by the route search execution unit 104*d* on the basis of the information on the departure input to the departure input box 121L1 and the information on the destination input to the destination input box 121L2 (S704).

Figure 22B:
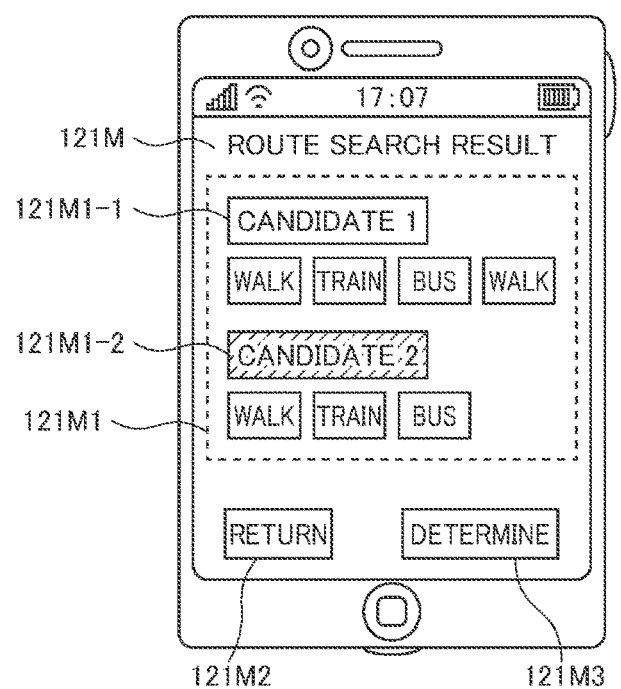

Then, the route selection screen 121M is displayed as illustrated in FIG. 22B (S705). The route selection screen 121M includes, for example, a candidate route list 121M1, a return icon 121M2, and a determination icon 121M3. A candidate selection icon for selecting one of route candidates obtained through the search of S704, route travel means such as walk or train, and the like are displayed in the candidate route list 121M1. In this example, as an icon for selecting one of the route candidates, icons 121M1-1 and 121M1-2 are displayed, and the icon of the selected route is displayed by changing color. The route selection on the candidate route list 121M1 may be performed, for example, by tapping a predetermined region on the touch panel 140*t* corresponding to a position on the display unit 121 where the candidate selection icon is displayed.

Then, the camera function execution unit 104*b* receives a selection input for an icon included in the route selection screen 121M from a user (S706) and performs a branching process S707 depending on the selected icon.

If a selection input for the return icon 121M2 is received in S706, the operation returns to S701, and the route selection screen 121L is displayed.

Figure 22C:
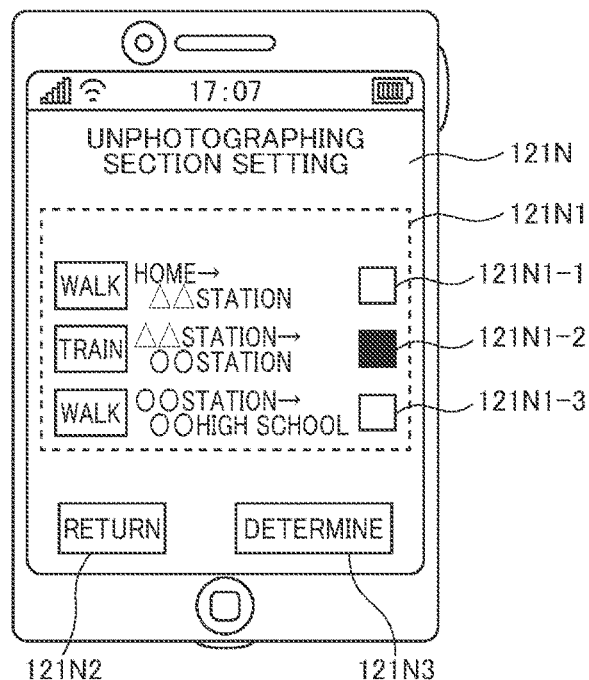

If a selection input for the determination icon 121M3 is received in S706, an unphotographing section setting screen 121N for selecting a section whose photographing image obtained from the camera is not stored for the route corresponding to the selected candidate selection icon is displayed as illustrated in FIG. 22C (S708).

The unphotographing section setting screen 121N includes, for example, a route list 121N1 for each travel means, a return icon 121N2, and a determination icon 121N3. Route sections for each travel means, and a checkbox for setting the unphotographing section are displayed in the route list 121N1. In this example, checkboxes 121N1-1, 121N1-2, and 121N1-3 are displayed as the checkbox for selecting the unphotographing section, such that a checkbox for the selected route is distinguished by changing color. Here, for example, the checkbox 121N1-2 is selected, and the train section is selected as the unphotographing section.

Note that it is assumed that the image photographed by the camera is stored even when a user travels out of the route obtained from the route search in the middle of a section not selected as the unphotographing section.

Then, the camera function execution unit 104*b* receives a selection of the checkbox on the route list 121N1 and a selection input for an icon included in the unphotographing section setting screen 121N from a user (S709), and executes the branching process S710 depending on the selected icon.

If a selection input for the return icon 121N2 is received in S709, the operation returns to S705, and the route selection screen 121M is displayed.

Figure 22D:
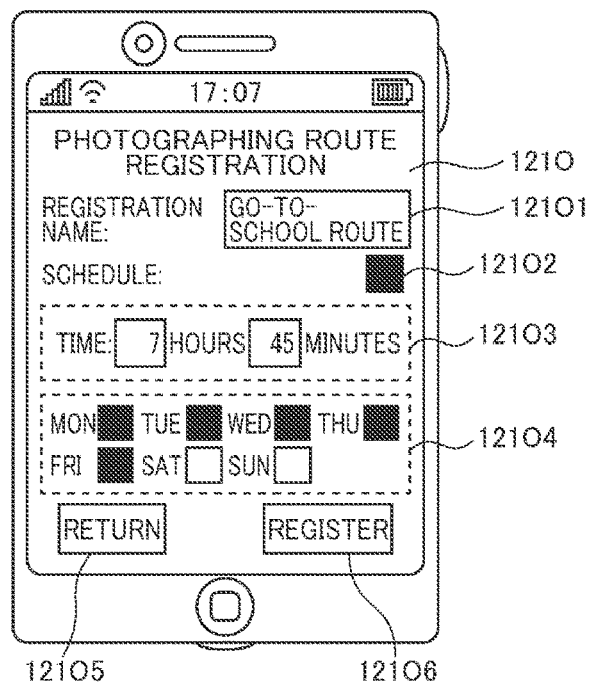

If a selection input for the determination icon 121N3 is received in S709, the route registration screen 121O is displayed as illustrated in FIG. 22D (S711). The route registration screen 121O includes, for example, a registration name input box 121O1, a schedule ON/OFF setting checkbox 121O2, a time setting box 121O3, a day-of-week setting checkbox 121O4, a return icon 121O5, and a registration icon 121O6. A selection input for a day of the week for executing the route photographing may be performed, for example, by tapping a predetermined region on the touch panel 140*t* corresponding to a position on the display unit 121 where the day-of-week setting checkbox 121O4 is displayed. Here, the checkbox of the selected day of week is displayed by changing color.

Then, the camera function execution unit 104*b* receives an input for the registration name on the registration name input box 121O1 of the route registration screen 121O, an input for the time on the schedule ON/OFF setting checkbox 121O2 and the time setting box 121O3, and a selection input for an icon from a user (S712), and executes the branching process S713 depending on the selected icon.

If a selection input for the return icon 121O5 is received in S712, the operation returns to S708, and the unphotographing section setting screen 121N is displayed.

If a selection input for the registration icon 121O6 is received in S712, information on the route selected from the route selection screen 121M, information on the unphotographing section selected from the unphotographing section setting screen 121N, information on the schedule for the route photographing, and the like are registered using the registration name input to the registration name input box 121O1 of the route registration screen 121O, and are stored in the route information storage area 110*c*4 of the storage unit 110 (S714).

Then, a branching process is performed on the basis of the schedule ON/OFF setting of the schedule ON/OFF setting checkbox 121O2. If the schedule setting is set to "OFF", the new route registration process S606 is terminated, and the operation returns to S602 illustrated in the flowchart of FIG. 19, so that the route list screen 121*k* is displayed. If the schedule setting is set to "ON", the schedule management execution unit 104*e* is set such that an interrupt occurs at the date/time or the day of week input on the route registration screen 121O (S716), and the new route registration process S606 is terminated.

Figure 23:
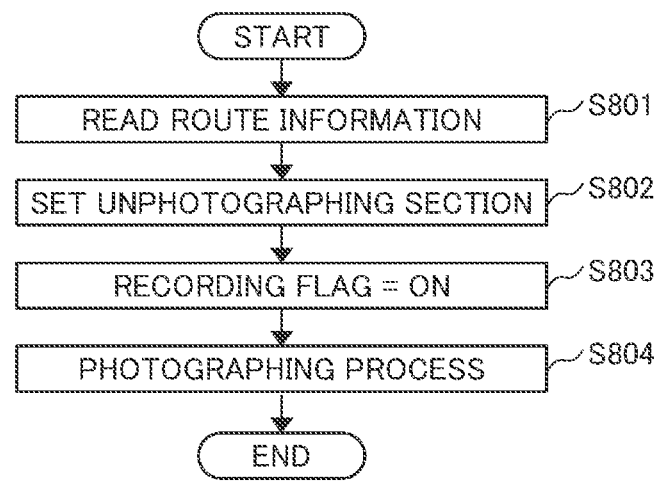
FIG. 23 is a flowchart illustrating an exemplary scheduled photographing process of FIG. 17.

The scheduled photographing process S110 will be described with reference to an exemplary flowchart of FIG. 23. Referring to FIG. 23, in the scheduled photographing process S110, first, information on the routes registered in the schedule including the timing at which the schedule interrupt occurs is read from the route information storage area 110*c*4 of the storage unit 110 (S801). A section registered as the unphotographing section is set as the unphotographing place on the basis of the read route information (S802). Then, the recording flag is set to "ON" (S803), and the operation advances to the photographing process S804. Here, the photographing process S804 is similar to the photographing process S107 described in conjunction with the flowchart of FIG. 12, and it will not be described repeatedly. Here, in S515 of FIG. 12, the branching process is performed depending on whether or not the position acquired in S502 is within a predetermined distance range from the unphotographing section set in S802, and within a predetermined distance range from the unphotographing place stored in the unphotographing place storage area 110*c*2.

In the aforementioned example, a route from the departure to the destination is searched, and the unphotographing section is set for each travel means in the route, so that it is possible to easily register a section where a user uses a transportation means such as a train as the unphotographing section. In addition, the setting can be made such that the photographed image data and information on the photographed place are not stored for a relatively safe section in the middle of the route. Therefore, it is possible to save communication traffics transmitted to the image data server or a capacity of the image data storage area.

By setting the schedule of the photographing process, the photographing automatically starts. Therefore, it is possible to prevent a user from failing to store image data by forgetting to start the photographing when going to school or the like.

In the aforementioned embodiment, a user sets the unphotographing section in the route. Alternatively, data regarding safe sections such as public transportation means registered in advance may be stored in the storage unit as a factory setting, or may be acquired via a network to set them as the unphotographing sections.

A risk level may change depending on time even in the same place or the same route. In order to cope with such a problem, the unphotographing place or the route setting may change depending on time.

Data regarding safe places, sections, and time zones may be stored in the storage unit in advance as a factory setting or may be acquired via a network, so that a prompting function for prompting a user to start photographing in unsafe places, sections, and time zones may be provided.

In the aforementioned embodiment, a user sets the schedule of the photographing process. Alternatively, on the basis of information regarding the day of the week and photographing timings in the list of the photographed image data stored in the image data storage area 110c3 of the image data server or the storage unit 110, days of the week to be photographed and a photographing start timing may be automatically set as a schedule in a case where it is recognized that the image data starts to be acquired a predetermined number of times or more frequently at a regular basis for a predetermined period of time such as thirty minutes at nearly the same timing on nearly the same day of the week. The photographing start timing is set to, for example, the earliest timing having a predetermined time interval.

Figure 24:
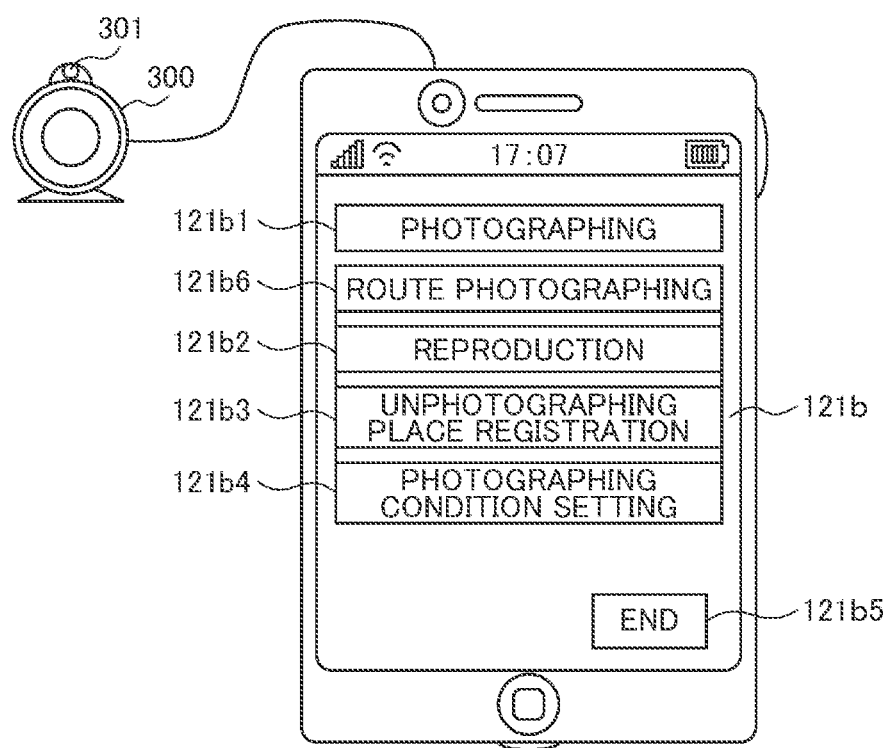
FIG. 24 illustrates an exemplary configuration in which the image input unit and the image recording device are separately provided.

A case where the second image input unit 124 is provided separately from the image recording device 100 will be described with reference to FIG. 24. FIG. 24 illustrates an example in which the camera 300 is provided separately from the image recording device 100, and is connected to the image input interface of the image recording device 100 via wired communication. Naturally, they may also be connected to each other via wireless communication. In FIG. 24, for example, an infrared LED 301 is provided, and the camera 300 has an infrared camera function, so that image data can be acquired during the night time by performing the infrared photographing using the camera 300 by irradiating infrared rays from the infrared LED 301.

As described above, according to this embodiment, the information processing device includes the image input unit that acquires image data from an optical image, a signal receiver unit that acquires a position computation signal, a communication unit that transmits the image data, a first memory unit that stores position information on places where the image data is not transmitted, a second memory unit that stores routes for each travel means between two points and sections in which no image data is transmitted in the routes for each travel means, and a control unit that controls transmission of the image data on the basis of the position information acquired from the position computation signal, the position information stored in the first memory unit, and the sections stored in the second memory unit.

The information processing device has a schedule memory unit that stores a date/time for obtaining the image data from the image input unit, and a schedule management unit that generates an interrupt at the date/time stored in the schedule memory unit. The control unit reads sections in which no image data is transmitted in the routes for each travel means stored in the second memory unit in the event of an interrupt, and controls execution of transmission of the image data on the basis of the position information acquired from the position computation signal, the position information stored in the first memory unit, and the sections stored in the second memory unit.

The control unit controls execution of transmission of the image data on the basis of the interrupt occurrence timing, the position information acquired from the position computation signal, and the position information stored in the first memory unit.

Functions of the invention described above may be realized partly or entirely as hardware by designing an integrated circuit or the like. Alternatively, functions of the invention may also be realized as software by allowing a microprocessor unit or the like to analyze and execute a program for implementing each of the functions. Alternatively, the functions of the invention may also be realized as both hardware and software.

The aforementioned embodiments have been described by assuming that functions of the invention are realized by executing three programs, including the camera function program 110a, the route search program 110d, and the schedule management program 110e. Alternatively, the functions of the invention may be realized by executing only one program having the same functions as those of each of the three programs. Each of the programs may be stored in the ROM 103 of the image recording device 100, the storage unit 110, or the like in advance as a factory setting. Alternatively, the programs may be acquired from the application server 211 or the like on the wide-area public network 201 via the LAN communication unit 151 or the mobile telephone network communication unit 152 after delivered from the factory. In addition, the programs may be stored in a memory card or the like and may be acquired via the expanded interface unit 170.

REFERENCE SIGNS LIST 100 image recording device
101 main control unit
102 system bus
103 ROM
104 RAM
104a basic operation execution unit
104b camera function execution unit
104c position information acquirement execution unit
104d route search execution unit
104e schedule management execution unit
110 storage unit
120 image processing unit
121 display unit
122 video signal processing unit
123 first image input unit
124 second image input unit
130 sound processing unit
131 sound output unit
132 sound signal processing unit
133 sound input unit
140 manipulation unit
150 communication processing unit
160 sensor unit
170 expanded interface unit

The invention claimed is:
1. An information processing device comprising:
a device configured to obtain a current position information of the information processing device;

a transceiver configured to transmit the current position information;

a memory configured to store information regarding a predetermined area which is newly registerable by adjusting a position of an icon for registering an area where no position information is transmitted on a displayed map; and a controller, wherein, if the controller recognizes, based on the current position information, that the information processing device is in the predetermined area, the controller is configured to control the transceiver not to transmit the current position information.

2. The information processing device according to claim 1, wherein the memory is configured to store information regarding a place where no position information is transmitted as the information regarding the predetermined area.

3. The information processing device according to claim 1, wherein the memory is configured to store information regarding routes between two points for each travel means and sections of the routes of each travel means where no position information is transmitted as the information regarding the predetermined area.

4. The information processing device according to claim 1, further comprising:

an imager configured to acquire image data to which the current position information is added;

wherein, if the controller recognizes, based on the current position information, that the information processing device is in the predetermined area, the controller is configured to control the transceiver not to transmit the current position information which is added to the image data.

5. The information processing device according to claim 4, wherein the transceiver is configured to further transmit the image data, wherein, if the controller recognizes, based on the current position information, that the information processing device is outside the predetermined area, the controller is configured to control the transceiver to transmit the image data with the current position information.

6. The information processing device according to claim 4, wherein the transceiver is configured to further transmit the image data, wherein, if the controller recognizes, based on the current position information, that the information processing device is in the predetermined area, the controller is configured to control the transceiver not to transmit the image data with the current position information.

7. The information processing device according to claim 1, wherein the displayed map displays both another icon indicating another registered area where no position information is transmitted and the icon on one screen.

8. A method comprising the steps of:

obtaining a current position information of an information processing device;

storing information regarding a predetermined area which is newly registerable by adjusting a position of an icon for registering an area where no position information is transmitted on a displayed map;

controlling to transmit the current position information if, based on the current position information, it is determined that the information processing device is not in the predetermined area, and controlling to not transmit the current position information if, based on the current position information, it is determined that the information processing device is in the predetermined area.

9. The method according to claim 8, further comprising the step of:

storing information regarding a place where no position information is transmitted as the information regarding the predetermined area.

10. The method according to claim 8, further comprising the step of:

storing information regarding routes between two points for each travel means and sections of the routes of each travel means where no position information is transmitted as the information regarding the predetermined area.

11. The method according to claim 8, further comprising the steps of:

acquiring image data to which the current position information is added; and controlling to not transmit the current position information which is added to the image data if, based on the current position information, it is determined that the information processing device is in the predetermined area.

12. The method according to claim 11, further comprising the step of:

controlling to transmit the current position information with the image data if, based on the current position information, it is determined that the information processing device is not in the predetermined area.

13. The method according to claim 11, further comprising the step of:

controlling to not transmit the image data with the current position information if, based on the current position information, it is determined that the information processing device is in the predetermined area.

14. The method according to claim 8, wherein the displayed map displays both another icon indicating another registered area where no position information is transmitted and the icon on one screen.

* * * * *